United States Patent
Dannenberg et al.

(10) Patent No.: US 12,024,273 B1
(45) Date of Patent: *Jul. 2, 2024

(54) MARINE PROPULSION CONTROL SYSTEM, METHOD, AND USER INTERFACE FOR MARINE VESSEL DOCKING AND LAUNCH

(71) Applicant: Brunswick Corporation, Mettawa, IL (US)

(72) Inventors: Todd D. Dannenberg, Fond du Lac, WI (US); Matthew E. Derginer, Butte des Morts, WI (US); Travis C. Malouf, Germantown, WI (US); Aaron J. Ward, Oshkosh, WI (US); Troy R. Brockdorf, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,213

(22) Filed: Apr. 10, 2023

Related U.S. Application Data

(63) Continuation of application No. 16/752,889, filed on Jan. 27, 2020, now Pat. No. 11,702,178.

(Continued)

(51) Int. Cl.
  B63H 21/21 (2006.01)
  G05D 1/00 (2006.01)

(52) U.S. Cl.
  CPC ........... B63H 21/21 (2013.01); G05D 1/0206 (2013.01); *B63H 2021/216* (2013.01)

(58) Field of Classification Search
  CPC . B63H 21/21; B63H 2021/216; G05D 1/0206
  See application file for complete search history.

(56) References Cited

U.S. PATENT DOCUMENTS

| | | |
|---|---|---|
| 5,515,287 A | 5/1996 | Hakoyama et al. |
| 6,234,100 B1 | 5/2001 | Fadeley et al. |

(Continued)

FOREIGN PATENT DOCUMENTS

| | | |
|---|---|---|
| CA | 2279165 | 1/2001 |
| CA | 2282064 | 1/2001 |

(Continued)

OTHER PUBLICATIONS

John Bayless, Adaptive Control of Joystick Steering in Recreational Boats, Marquette University, Aug. 2017, https://epublications.marquette.edu/cgi/viewcontent.cgi?article=1439&context=theses_open.

(Continued)

*Primary Examiner* — S. Joseph Morano
*Assistant Examiner* — Jovon E Hayes
(74) *Attorney, Agent, or Firm* — Andrus Intellectual Property Law, LLP

(57) ABSTRACT

A method for controlling a propulsion system of a marine vessel includes receiving proximity measurements from one or more proximity sensors on the marine vessel, identifying an object located less than a buffer distance from a side of the marine vessel, and controlling a display device to indicate the side of the marine vessel where the object is located. A user input is then received to activate a buffer zone on the side of the marine vessel where the object is located, and then at least one propulsion device is automatically controlled based on the proximity measurements to move the marine vessel away from the object.

20 Claims, 17 Drawing Sheets

Related U.S. Application Data

(60) Provisional application No. 62/799,427, filed on Jan. 31, 2019.

(56) References Cited

U.S. PATENT DOCUMENTS

| | | |
|---|---|---|
| 6,273,771 B1 | 8/2001 | Buckley et al. |
| 7,267,068 B2 | 11/2007 | Bradley et al. |
| 7,725,253 B2 | 5/2010 | Foxlin |
| 8,195,381 B2 | 6/2012 | Arvidsson |
| 8,622,778 B2 | 1/2014 | Tyers et al. |
| 9,039,469 B1 | 5/2015 | Calamia et al. |
| 9,183,711 B2 | 11/2015 | Fiorini et al. |
| 9,355,463 B1 | 5/2016 | Arambel et al. |
| 9,615,006 B2 | 4/2017 | Terre et al. |
| 9,650,119 B2 | 5/2017 | Morikami et al. |
| 9,729,802 B2 | 8/2017 | Frank et al. |
| 9,734,583 B2 | 8/2017 | Walker et al. |
| 9,778,657 B2 | 10/2017 | Tyers |
| 9,878,769 B2 | 1/2018 | Kinoshita et al. |
| 9,996,083 B2 | 1/2018 | Vojak |
| 9,908,605 B2 | 3/2018 | Hayashi et al. |
| 9,927,520 B1 | 3/2018 | Ward et al. |
| 9,988,134 B1 | 6/2018 | Gable et al. |
| 10,037,701 B2 | 7/2018 | Harnett |
| 10,048,690 B1 | 8/2018 | Hilbert et al. |
| 10,055,648 B1 | 8/2018 | Grigsby et al. |
| 10,106,238 B2 | 10/2018 | Sidki et al. |
| 10,126,748 B2 | 11/2018 | Akuzawa et al. |
| 10,191,153 B2 | 1/2019 | Gatland |
| 10,191,490 B2 * | 1/2019 | Akuzawa ............... B63H 25/04 |
| 10,272,977 B2 | 4/2019 | Hashizume et al. |
| 10,281,917 B2 | 5/2019 | Tyers |
| 10,338,800 B2 | 7/2019 | Rivers et al. |
| 10,429,845 B2 * | 10/2019 | Arbuckle ............... B63H 21/21 |
| 10,431,099 B2 * | 10/2019 | Stewart ............... G08G 3/02 |
| 10,444,349 B2 * | 10/2019 | Gatland ............... G01C 21/203 |
| 10,507,899 B2 * | 12/2019 | Imamura ............... B63B 79/20 |
| 10,746,552 B2 | 8/2020 | Hashizume et al. |
| 2003/0137445 A1 * | 7/2003 | Van Rees ............... G05D 1/0206 342/61 |
| 2005/0075016 A1 | 4/2005 | Bertetti et al. |
| 2006/0058929 A1 | 3/2006 | Fossen et al. |
| 2007/0089660 A1 | 4/2007 | Bradley et al. |
| 2011/0153125 A1 | 6/2011 | Arbuckle et al. |
| 2011/0172858 A1 | 7/2011 | Gustin et al. |
| 2014/0316657 A1 | 10/2014 | Johnson et al. |
| 2015/0009325 A1 | 1/2015 | Kardashov |
| 2015/0032305 A1 | 1/2015 | Lindeborg |
| 2015/0089427 A1 * | 3/2015 | Akuzawa ............... G05D 1/0206 715/771 |
| 2015/0134146 A1 | 5/2015 | Pack et al. |
| 2015/0172545 A1 | 6/2015 | Szabo et al. |
| 2015/0276923 A1 | 10/2015 | Song et al. |
| 2015/0288891 A1 | 10/2015 | Johansson et al. |
| 2015/0294660 A1 | 10/2015 | Stokes et al. |
| 2015/0375837 A1 | 12/2015 | Johnson et al. |
| 2015/0378361 A1 | 12/2015 | Walker et al. |
| 2016/0041039 A1 | 2/2016 | Olsson |
| 2016/0069681 A1 | 3/2016 | Johnson et al. |
| 2016/0070265 A1 | 3/2016 | Liu et al. |
| 2016/0125739 A1 | 5/2016 | Stewart et al. |
| 2016/0162145 A1 | 6/2016 | Rivers et al. |
| 2016/0187140 A1 | 6/2016 | Clarke et al. |
| 2016/0196653 A1 | 7/2016 | Grant et al. |
| 2016/0214534 A1 | 7/2016 | Richards et al. |
| 2016/0334794 A1 | 7/2016 | Johnson et al. |
| 2016/0370187 A1 | 12/2016 | Gatland et al. |
| 2017/0052029 A1 | 2/2017 | Ninomiya et al. |
| 2017/0059705 A1 | 3/2017 | Stokes et al. |
| 2017/0064238 A1 | 3/2017 | Kardashov |
| 2017/0090021 A1 | 3/2017 | Sayer et al. |
| 2017/0146642 A1 | 5/2017 | Stokes et al. |
| 2017/0167871 A1 | 6/2017 | Johnson et al. |
| 2017/0168159 A1 | 6/2017 | Gatland |
| 2017/0176586 A1 | 6/2017 | Johnson et al. |
| 2017/0184414 A1 | 6/2017 | Johnson et al. |
| 2017/0205829 A1 * | 7/2017 | Tyers ............... B63H 25/04 |
| 2017/0227639 A1 | 8/2017 | Stokes et al. |
| 2017/0243360 A1 | 8/2017 | Schulte |
| 2017/0253314 A1 | 9/2017 | Ward |
| 2017/0277189 A1 | 9/2017 | Johnson et al. |
| 2017/0285134 A1 | 10/2017 | Stokes et al. |
| 2017/0300056 A1 | 10/2017 | Johnson et al. |
| 2017/0365175 A1 | 12/2017 | Harnett |
| 2017/0371348 A1 | 12/2017 | Mou |
| 2018/0023954 A1 | 1/2018 | Rivers |
| 2018/0050772 A1 | 2/2018 | Koyano et al. |
| 2018/0057132 A1 | 3/2018 | Ward et al. |
| 2018/0081054 A1 | 3/2018 | Rudzinsky et al. |
| 2018/0259338 A1 | 9/2018 | Stokes et al. |
| 2018/0259339 A1 | 9/2018 | Johnson et al. |
| 2018/0292529 A1 | 10/2018 | Hogasten |
| 2019/0098212 A1 * | 3/2019 | Shain ............... H04N 23/90 |
| 2019/0137618 A1 * | 5/2019 | Hawker ............... G01S 19/45 |
| 2019/0251356 A1 * | 8/2019 | Rivers ............... G01C 21/203 |
| 2019/0258258 A1 | 8/2019 | Tyers |
| 2019/0283855 A1 * | 9/2019 | Nilsson ............... B63H 20/20 |
| 2019/0299983 A1 * | 10/2019 | Shalev-Shwartz ............... B60W 30/095 |

FOREIGN PATENT DOCUMENTS

| | | | |
|---|---|---|---|
| CN | 110325823 | 10/2019 | |
| DE | 112013004908 | 6/2015 | |
| EP | 1775212 | 4/2007 | |
| EP | 1873052 | 1/2008 | |
| EP | 1873052 A2 * | 1/2008 | ............ B63B 21/00 |
| EP | 3182155 | 6/2017 | |
| EP | 2824528 | 3/2019 | |
| EP | 3689736 A1 * | 8/2020 | ............ B63H 21/21 |
| JP | 7246998 | 10/1999 | |
| JP | 2016049903 | 4/2016 | |
| JP | 2017178242 | 10/2017 | |
| KR | 20140011245 | 1/2014 | |
| WO | 9305406 | 3/1993 | |
| WO | 2006040785 | 4/2006 | |
| WO | 2006062416 | 6/2006 | |
| WO | 2008066422 | 6/2008 | |
| WO | 2012010818 | 1/2012 | |
| WO | 2017095235 | 6/2017 | |
| WO | 2017167905 | 10/2017 | |
| WO | 2017168234 | 10/2017 | |
| WO | WO-2017168234 A1 * | 10/2017 | ............ B63B 49/00 |
| WO | 2017205829 | 11/2017 | |
| WO | WO-2017205829 A1 * | 11/2017 | ............ B63B 49/00 |
| WO | 2018162933 | 9/2018 | |
| WO | 2018172849 | 9/2018 | |
| WO | 2018183777 | 10/2018 | |
| WO | 2018201097 | 11/2018 | |
| WO | 2018232376 | 12/2018 | |
| WO | 2018232377 | 12/2018 | |
| WO | WO-2018232377 A1 * | 12/2018 | ............ B63B 49/00 |
| WO | 2019011451 | 1/2019 | |
| WO | 2019096401 | 5/2019 | |
| WO | 2019126755 | 6/2019 | |
| WO | 2019157400 | 8/2019 | |
| WO | 2019180506 | 9/2019 | |
| WO | 2019201945 | 10/2019 | |

OTHER PUBLICATIONS

Extended European Search Report issued in corresponding EP Application No. 20154336.0 mailed Jun. 25, 2020.
W. Xu et al., "Internet of Vehicles in Big Data Era." in IEEE/CAA Journal of Automatica Sinica, vol. 5, No. 1, pp. 19-35, Jan. 2018, doi:10.1109/JAS.2017.7510736. (Year 2018).
An Autonomous Solar-Powered Marine Robitic Ibservatory for Permanent Monitoring of Large Areas of Shallow Water by I. Gonzalez-Reolid et al.; Sensors 2018, 18(10), 3497; https://doi.org/10.3390/s18103497 (Year 2018).

(56) References Cited

OTHER PUBLICATIONS

S. Reed and V.E. Schmidt, "Providing Nautical Chart Awareness to Autonomous Surface Vessel operations," OCEANS 2016 MTS/IEEE Monterery, 2016, pp. 1-8, doi: 10.1109/OCEANS.2016.7761472 (Year 2016).

* cited by examiner

MARINE PROPULSION CONTROL SYSTEM, METHOD, AND USER INTERFACE FOR MARINE VESSEL DOCKING AND LAUNCH

CROSS-REFERENCE TO RELATED APPLICATION

The present application is a continuation of U.S. application Ser. No. 16/752,889, filed Jan. 27, 2020, which claims priority to U.S. Provisional Application Ser. No. 62/799,427, filed Jan. 31, 2019, which application is hereby incorporated by reference in its entirety.

FIELD

The present disclosure generally relates to propulsion control systems and methods for controlling propulsion of a marine vessel, and more specifically to control and user interface systems and methods for controlling propulsion of the marine vessel during docking, launch, or other situations in close proximity to an object.

BACKGROUND

The following U.S. Patents are incorporated herein by reference, in entirety:

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a marine propulsion system includes at least one propulsion device and a user input device configured to facilitate input for engaging automatic propulsion control functionality with respect to a docking surface, wherein the user input device includes a direction indicator display configured to visually indicate a direction with respect to the marine vessel. A controller is configured to identify a potential docking surface, determine a direction of the potential docking surface with respect to the marine vessel, and control the direction indicator display to indicate the direction of the potential docking surface with respect to the marine vessel. When a user selection is received via the user input device to select the potential docking surface as a selected docking surface, and propulsion of the marine vessel is automatically controlled by controlling the at least one propulsion device to move the marine vessel with respect to the selected docking surface.

One embodiment of a method for controlling propulsion of a marine vessel includes receiving proximity measurements from one or more proximity sensors on the marine vessel and identifying at least one potential docking surface based on the proximity measurements. User input authority over propulsion output is then limited in a direction of the at least one potential docking surface by at least one propulsion device based on the proximity measurements so as to maintain the marine vessel at least a buffer distance from the at least one potential docking surface. A user input device is controlled to indicate the direction of each of the at least one potential docking surface with respect to the marine vessel, and a user selection is received via the user input device to engage autodocking with respect to a selected docking surface, wherein the selected docking surface is at least one of the potential docking surfaces. The at least one propulsion device is then automatically controlled based on the proximity measurements to move the marine vessel toward the selected docking surface such that the marine vessel gently impacts the selected docking surface.

Another embodiment of a method for controlling a propulsion system of a marine vessel includes receiving proximity measurements from one or more proximity sensors on the marine vessel and identifying, based on the proximity measurements, an object located less than a buffer distance from a side of the marine vessel. A buffer zone is activated on clear sides of the marine vessel where an object is not detected so as to limit user input authority over propulsion output such that the respective side of the marine vessel is maintained at least the buffer distance from any object. A user input device is controlled to indicate a side of the marine vessel where the object is located and the buffer zone is not active, and a user selection is received via the user input device to activate the buffer zone on the side of the marine vessel where the object is located. At least one propulsion device is then controlled based on the proximity measurements to move the marine vessel away from the object while maintaining the buffer zone on each of the clear sides.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
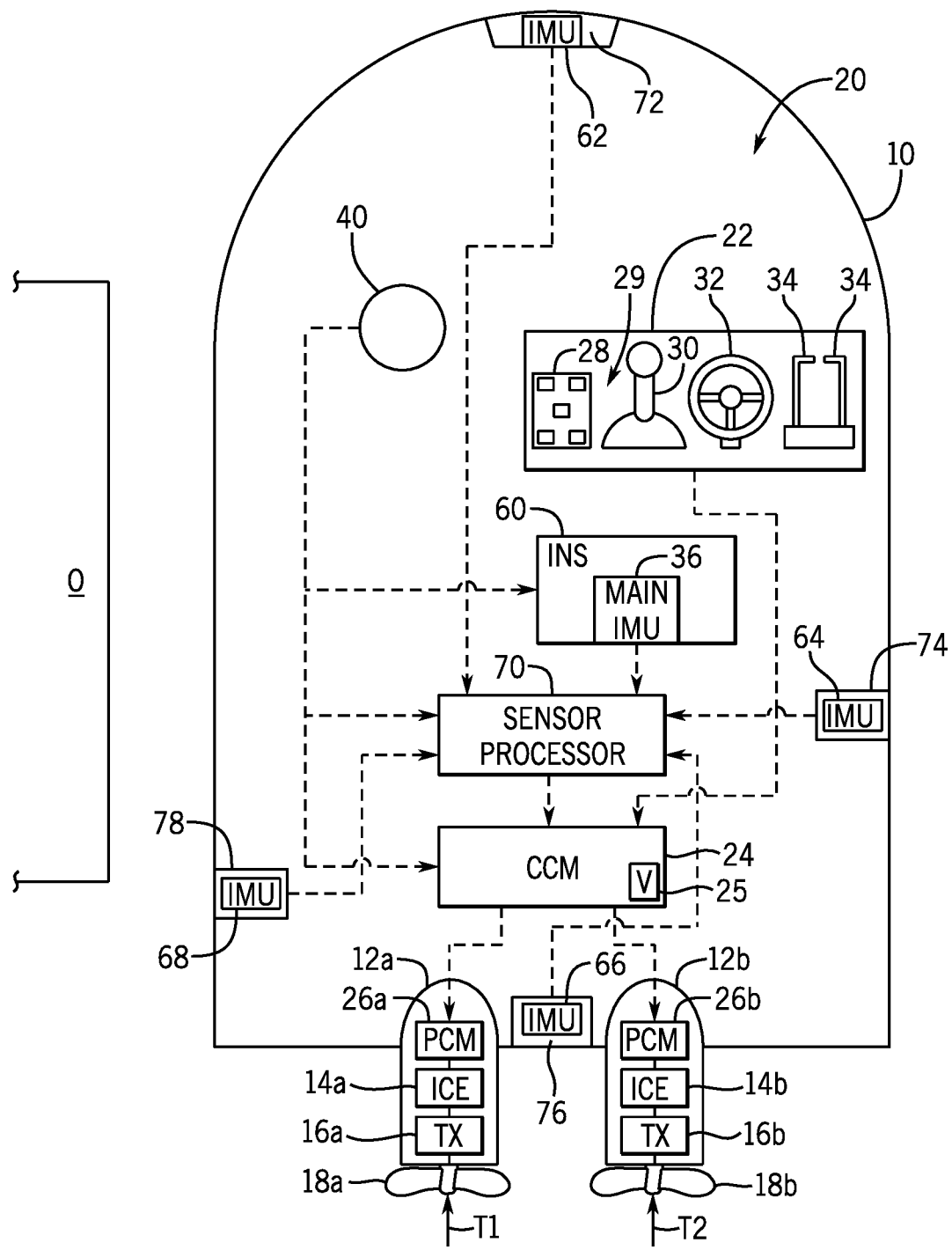
FIG. 1 is a schematic representation of an exemplary propulsion system on a marine vessel.

FIG. 1 shows a marine vessel 10 equipped with a propulsion control system 20 on a marine vessel 10 configured according to one embodiment of the disclosure. The propulsion control system 20 is capable of operating, for example, in a joysticking mode where a joystick is operated by an operator to control vessel movement within an x/y plane, among other modes, as described hereinbelow. The propulsion system 20 has first and second propulsion devices 12a, 12b that produce first and second thrusts T1, T2 to propel the vessel 10. The first and second propulsion devices 12a, 12b are illustrated as outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also houses various control elements that comprise part of the propulsion control system 20. The system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory and a programmable processor. As is conventional, each controller 24, 26a, 26b includes a processor communicatively connected to a storage system comprising a computer-readable medium that includes volatile or nonvolatile memory upon which computer readable code and data is stored. The processor can access the computer readable code and, upon executing the code, carry out functions, such as the navigation control functions and/or the proximity sensing functions, as described in detail below.

The operation console 22 includes a number of user input devices, such as a keypad 28, a joystick 30, a steering wheel 32, and one or more throttle/shift levers 34. The operation console 22 may further include a display 29, such as may be associated with an onboard management system, that is configured to visually present information to the operator (e.g., information regarding control mode, control settings), present control options to the operator, and receive user input from the operator in response to the control options. One example of such a display system is VesselView by Mercury Marine Company of Fond du Lac, Wisconsin. Each of these devices inputs commands to the controller 24. The controller 24, in turn, communicates control instructions to the first and second propulsion devices 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10.

The propulsion control system 20 also includes one or more proximity sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The proximity sensors 72-78 are distance and directional sensors. For example, the sensors could be radars, sonars, cameras, lasers (e.g. lidars or Leddars), Doppler direction finders, or other devices individually capable of determining both the distance and direction (at least approximately), i.e. the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single location on the vessel 10. The sensors 72-78 provide this distance and/or direction information to one or more controllers, such as to the sensor processor 70 and/or the CCM 24, such as by way of a dedicated bus connecting the sensors to a controller, a CAN bus, or wireless network transmissions, as described in more detail below.

Regarding the proximity sensors, 72, 74, 76, 78, note that different types of sensors may be used depending on the distance between the vessel 10 and the object O. For example, radar sensors may be used to detect objects at further distances. Once the vessel 10 comes within a particular distance of the object, lidar, ultrasonic, Leddar, or sonar sensors may instead be used. Camera sensors may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and cameras) to sense the shortest distance and the direction of the object with respect to the vessel 10. Alternatively, the sensor processor may use all available sensor data from all sensor types, which may be reviewed real time as it is received or may be formulated into one or more maps or occupancy grids integrating all proximity measurement data, where the mapped data from all the operated sensors is processed as described herein. In such an embodiment, the proximity measurements from each of the various sensors are all translated into a common reference frame.

Autonomous and/or advanced operator assistance (i.e., semi-autonomous) controls for improved vessel handling qualities requires placement of multiple proximity sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, a main inertial measurement unit (IMU) 36 is installed at a known location on the marine vessel with respect to a predefined point of navigation, such as the center of rotation (COR) or center of gravity (COG). The installation orientation or the main IMU 36 is also known. The installation locations of the main IMU 36 and each proximity sensor 72-78 are established as part of a calibration procedure for the proximity sensing system.

Referencing the example in FIG. 1, the main IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the main IMU 36 and may also receive information from a GPS receiver 40 comprising part of a global positioning system (GPS). The GPS receiver 40 is located at a pre-selected fixed position on the vessel 10, which provides information related to global position of the marine vessel 10. The main IMU 36 is also located at a known and fixed position with respect to the center of navigation determined for the marine vessel 10, such as the COR or COG.

In FIG. 1 an IMU 62-68 is co-located with each proximity sensor 72-78. These sensor IMUs 62-68 may be configured similarly to the main IMU, such as each comprising a rate gyro, an accelerometer, and a magnetometer and producing corresponding IMU data. The IMU data from each sensor IMU 62-68 may be used for various purposes, such as for automatic calibration and verification of the proximity sensor system, for angular measurements used to interpret the proximity measurements by the relevant proximity sensor 72-78, and/or as backup IMUs in case of fault or failure of the main IMU 36.

The inventors have recognized unique problems presented by autonomous and semi-autonomous vessel control systems for operating in marine environments where marine vessels have additional degrees of freedom of movement compared to automotive applications—for example, they can effectuate only lateral and yaw movement without any forward or reverse movement (e.g., in a joysticking mode). Additionally, marine environments pose unique external environmental factors acting on the marine vessel, such as current, wind, waves, or the like. The present inventors have recognized that autonomous and semi-autonomous control systems for marine vessels need to be "aware" of relevant vessel acceleration limits to avoid colliding with obstacles. By knowing the acceleration limit, and by having an awareness of the distance range to obstacles, the control system can determine a maximum vessel velocity that can be realized where the control system has the ability to avoid colliding with known obstacles. The acceleration limit is the maximum acceleration a vessel can reach for both speeding up and slowing down, where maximum deceleration of a marine vessel is accomplished by effectuating a maximum acceleration in the opposite direction.

The inventors have recognized that the above-mentioned operational challenges posed by a marine environment can be effectively dealt with by establishing and maintaining a buffer distance around the marine vessel, where the control authority provided to an operator is limited based on the buffer distance. For example, the propulsion control system may continuously calculate a maximum velocity, or velocity limit, for the marine vessel as it approaches an object O, and may limit an operator's authority in controlling propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls in order to force the marine vessel 10 away from a marine object O when the buffer zone is violated.

Figure 2:
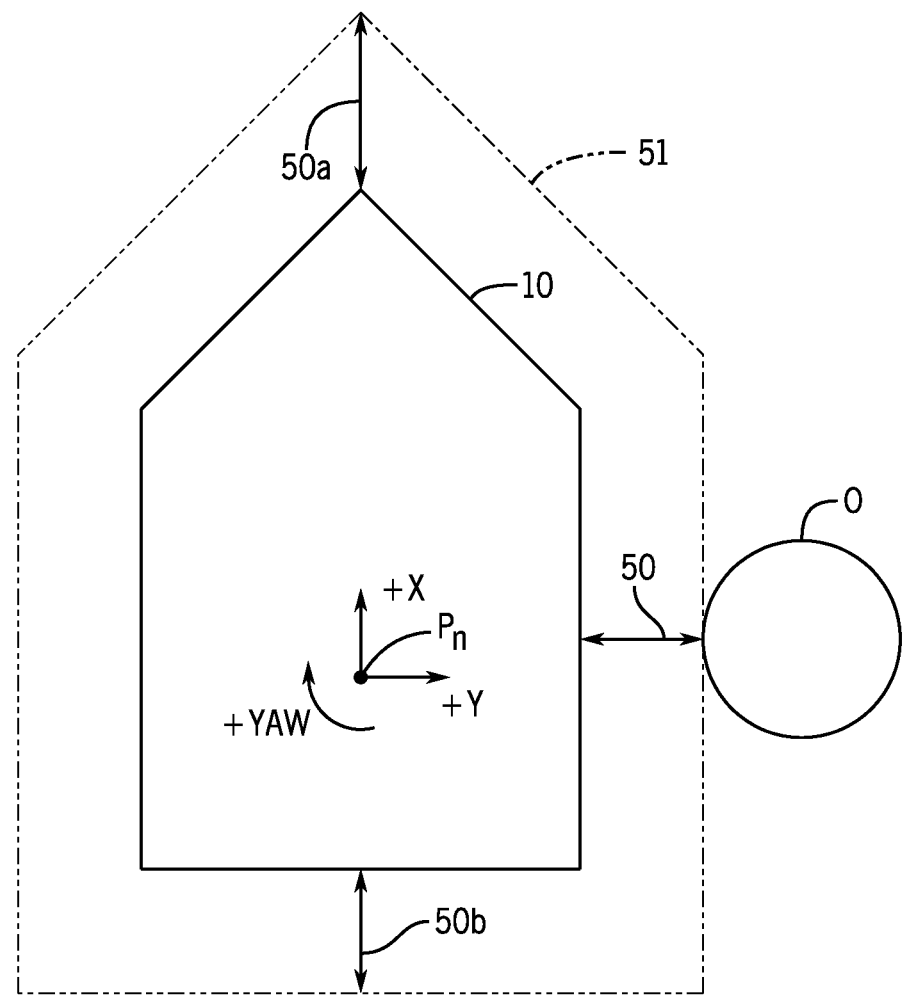
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated in order to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50*a* at the front side of the marine vessel than the buffer distance 50*b* on the rear side of the marine vessel. Similarly, a buffer distance on the starboard and port sides of the marine vessel 10 may be set the same or different than the front and rear buffer distances 50*a*, 50*b*.

The inventors have further recognized that maintenance of the buffer zone is not always desired or practical, such as when passengers are getting on and off the marine vessel. Through their experimentation and research, the inventors have recognized that maintenance of a minimum buffer distance between the marine vessel and an object, such as a dock, for instance, does not necessarily position the marine vessel well for passengers to disembark safely from a marine vessel. Depending on the vessel shape and the dock shape, holding a vessel parallel to the dock will not necessarily get passengers close enough to disembark safely and easily from the marine vessel. Moreover, holding the marine vessel steady at precisely the minimum buffer distance can be quite challenging or even impossible. Marine environmental factors and conditions, such as in heavy wind and waves, can inflict unpredictable forces affecting vessel movement. Moreover, many proximity sensing systems have minimum detection distances that fall short of the minimum distance for safe disembarking, and control systems implementing such proximity sensors cannot reliably hold the marine vessel at a minimum distance that is less than their minimum reliable detection capabilities.

The inventors have developed the disclosed docking system that limits an operator's authority to control propulsion of the marine vessel in the direction of the object so as to provide a controlled approach and impact to an object, such as a dock. The disclosed control system modifies or disables collision avoidance algorithms, such as the velocity limiting and autonomous buffer maintenance controls, upon receipt of a user-generated instruction to suspend the maintenance of the buffer distance from the object. In some embodiments, the control system remains responsive to user control inputs via a user input device, such as a joystick, to move the marine vessel in the direction of the object so as to provide a smooth and controlled impact between the marine vessel and the object, and/or to hold the marine vessel against the object, such as while passengers disembark. The user control, such as via the joystick 30, remains intuitive during the velocity limited control modality. For example, the limited user input authority provided via the joystick may be implemented by rescaling and/or offsetting the propulsion commands associated with the joystick positions.

In other embodiments described herein the control system provides autonomous control of propulsion so as to navigate the marine vessel 10 in tight spaces, such as during docking and launch. The inventors have recognized that docking a marine vessel is a challenging task, especially with external factors common in marine environments, such as wind, waves, and current. Accordingly, the inventors have recognized that autonomous control may be beneficial for certain marine vessel control tasks, especially those tasks requiring high visibility at all points around the marine vessel and/or precise propulsion control. Docking and launch are prime examples of such tasks because operators standing at the helm typically do not have good visibility at important points of the marine vessel, such as near the corners and along the exterior sides of the gunnels on the marine vessel. Docking and launch are among the common activities where damage is caused to the marine vessel or by the marine vessel, such as scratches and dents to the vessel hull or to adjacent vessels. Accordingly, the inventors have developed propulsion control systems and methods whereby the final steps of alignment and contact with a docking surface, and the initial steps to move a marine vessel safely away from a docking surface, may be performed autonomously utilizing advanced closed loop control in conjunction with proximity sensors at key points around the marine vessel.

The autonomous or semi-autonomous control algorithms, such as effectuated by the controller 24, include velocity control software performing algorithms to calculate a maximum velocity for the marine vessel 10 as it approaches an object O. Where propulsion control is based on user input, the controller 24 calculates a maximum velocity for the vessel and effectuates velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined, such as based on handling, comfort, or safety metrics.

The velocity limit, then, may be calculated based on that known acceleration limit based on the distance of an object O from the marine vessel 10, accounting for the buffer distance 50. Given that acceleration is the derivative of velocity, the relationship between a maximum acceleration for the marine vessel and a maximum velocity with respect to a distance to an object can be provided according to the following:

$$a_{max} = \frac{v_{max} - v_{final}}{\Delta r / v_{max}}$$

wherein $\Delta r$ is the allowable range to an object, which will be the measured distance to an object minus the predetermined buffer distance, and wherein $a_{max}$ is the known maximum acceleration for the marine vessel, and wherein $v_{final}$ is the velocity reached at the point where the object O hits the buffer zone 51 and where v max is the maximum velocity. Assuming that $v_{final}$ equals zero, the equation can be rearranged to solve for the maximum velocity in the direction of the object $\Delta r$ that guarantees the ability to stop without exceeding a max. Accordingly, v max can be calculated as:

$$v_{max} = \sqrt{\Delta r a_{max}}$$

Imaginary numbers can be avoided by using the absolute value of the root function before calculating, such as by using the signum function of the contents of the root function to identify the direction of the maximum velocity. Thus, $v_{max}$ can be represented as the following:

$$v_{max} = \text{sgn}(\Delta r \, a_{max}) \sqrt{|\Delta r a_{max}|}$$

Figure 3A:
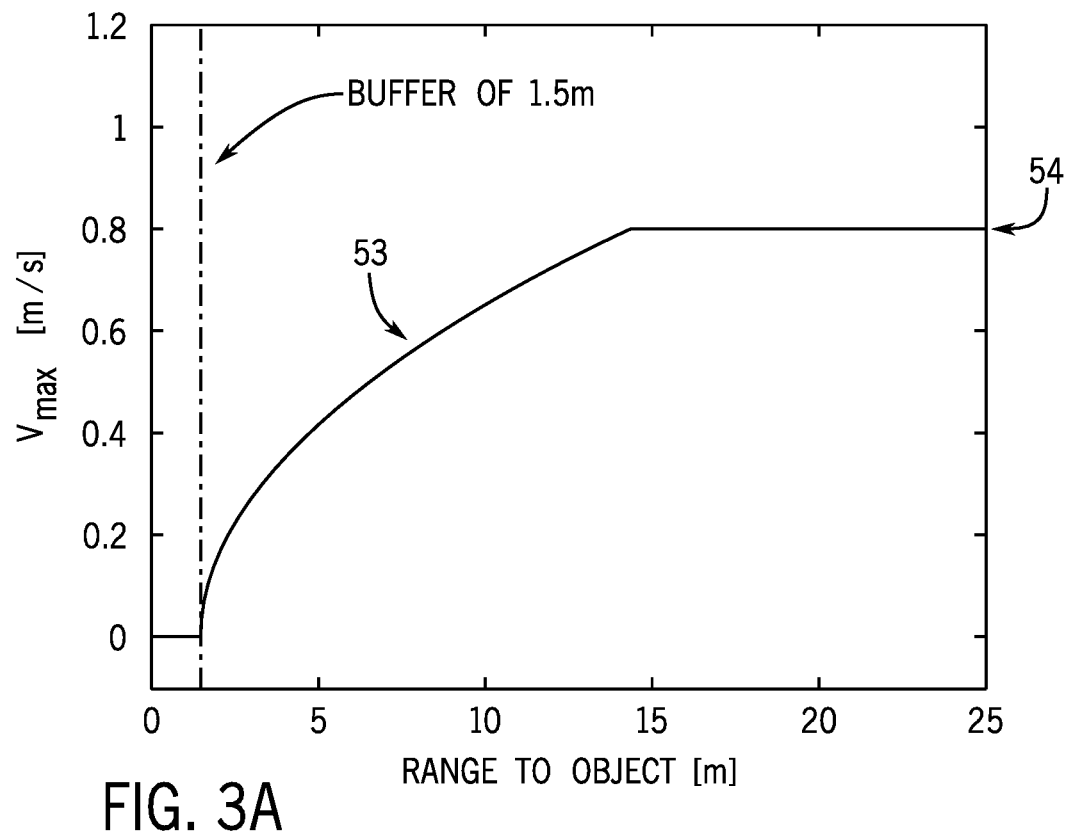
FIGS. 3A and 3B are graphs showing exemplary velocity limit ranges for an exemplary buffer distance of 1.5 meters.
Figure 3B:
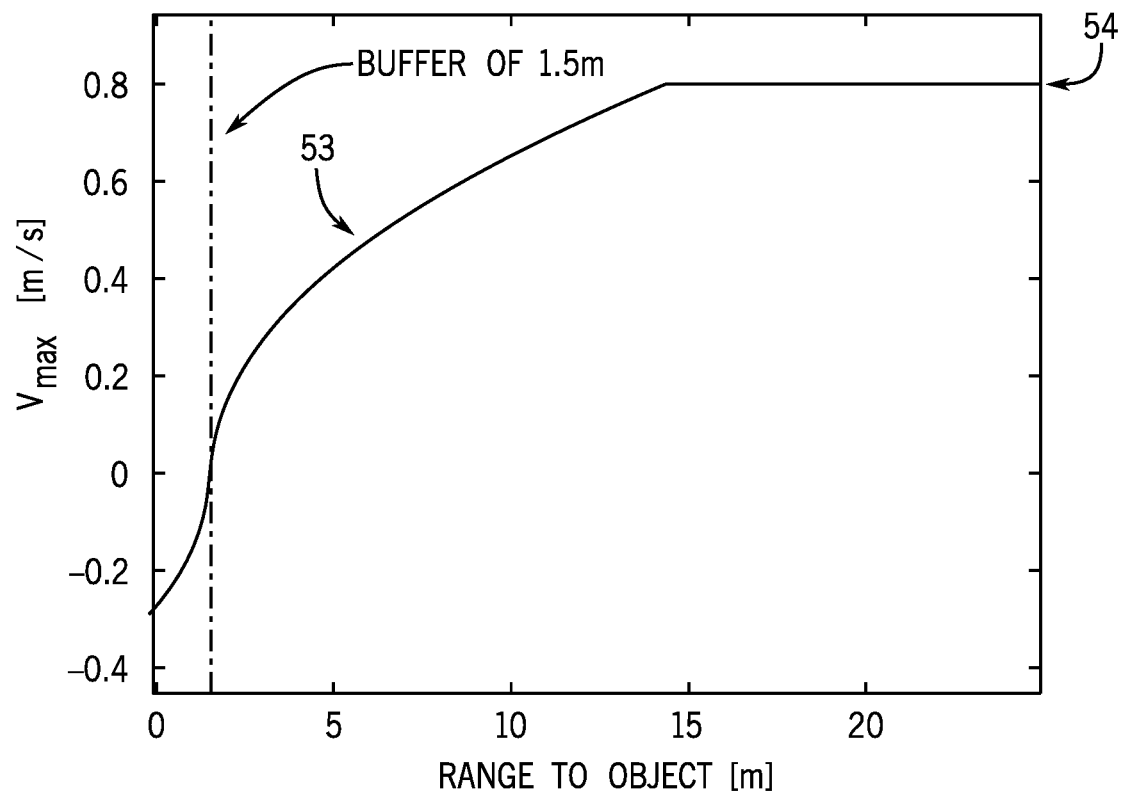

FIGS. 3A and 3B are graphs depicting velocity limit with respect to object distance for exemplary control scenarios where the preset buffer distance 50 around the marine vessel 10 is 1.5 meters. The velocity limit 53 decreases as the marine vessel 10 approaches the object O. When the marine vessel is 15 meters from the object O, for example, the velocity limit 53 in the direction of the object O is at a maximum of 0.8 m/s, and that velocity limit decreases as the marine vessel 10 moves towards the object O such that the velocity limit is zero when the marine vessel is at the buffer distance 50 of 1.5 meters from object O. Thus, inside the buffer zone 51, the operator does not have authority, such as via the joystick or other steering and thrust input device, to move the marine vessel 10 closer to the object. Accordingly, no thrust will be provided in the direction of the object O if the marine vessel is less than or equal to the preset buffer distance 50 from the object O, even if the operator provides input (such as via the joystick 30) instructing movement in the direction of the object O.

In the embodiment represented at FIG. 3A, the velocity limit 53 in the direction of the object may remain at zero while the buffer distance 50 is violated. Thereby, user authority will be limited such that user control input (e.g., via the joystick) to move the marine vessel 10 in the direction of the object will not be acted upon by the propulsion system 20. In other embodiments, the velocity limit 53 may be zero at the buffer distance 50 and then become negative once the distance to the object O is less than the buffer distance. In the scenario in FIG. 3B, the velocity limit 53 will become negative when the distance to the object is less than 1.5 meters and may become progressively more negative, increasing propulsion in the opposite direction of the object in order to propel the vessel away from the object O. The control system may be configured such that the negative velocity limit 53 is converted to a control command to effectuate a thrust away from the object O so that the marine vessel 10 is maintained at least the buffer distance 50 away from the object O.

As also illustrated in FIGS. 3A and 3B, a maximum propulsion authority 54 may be utilized, which sets a maximum for the velocity limit 53. The maximum propulsion authority 54 may be a predetermined value based on handling, comfort, or safety metrics for the relevant mode of operation where the disclosed velocity control is implemented, such as in a joysticking mode or a docking mode of operation where the control algorithms are configured to provide precise propulsion control of the marine vessel 10 operating at relatively low velocities. In the depicted examples, the maximum propulsion authority 54 is 0.8 m/s; however, faster or slower maximum speeds may be implemented depending on the vessel configuration and the expected control demands for the relevant mode of operation. The +/-yaw propulsion directions may have a maximum propulsion authority value in radians. Furthermore, different maximum propulsion authority values may be associated with different directions. For instance, the maximum propulsion authority value for the positive Y, or forward, direction may be higher than the maximum propulsion authority value for the negative Y, or backward, direction.

In one embodiment, the proximity sensor system, e.g., the proximity sensors 72-78 in concert with the sensor processor 70, may be configured to generate a most important object (MIO) dataset identifying a select set of closest proximity measurements. For example, the MIO dataset may identify distances in each of the six directions that a boat has control authority—+/-X, +/-Y, and +/-yaw directions—thereby informing the navigation controller of navigation constraints based on the location of objects O around the marine vessel. For example, the closest proximity measurements may be identified based on one or more simplified two-dimensional vessel outlines representing the vessel hull. In such an embodiment, the MIO dataset may be calculated using the simplified boat profile and low-computation-load geometry to generate the MIO dataset identifying the closest proximity measurements in each possible direction of movement of the marine vessel 10. In one embodiment, the MIO dataset includes six values specifying one closest proximity measurement in each of the +/−x directions, +/−y directions, and +/−yaw rotational directions.

In certain embodiments, the MIO dataset may always contain six values defining the closest proximity measurements in each of the aforementioned directions of movement. Thus, if no proximity measurements are detected in a particular direction, then a default large number may be provided which will be interpreted as non-limiting in the respective direction. To provide just one example, the default distance in the +/−yaw direction may be +/−180°. The navigation controller (e.g. controller 24) will interpret that default large rotation angle range to mean that the vessel can turn 180° without colliding with any object in the yaw direction. In other embodiments, the default large number may be greater than 180° (even as large as 360°), or may be smaller than 180°, such as 90°. The default large value in the x and y directions may be a large value, such as 10,000 meters, 50,000 meters, or more. In any such case, the default distance is large enough that the navigation controller will not limit any vessel movement based on the relevant default MIO data point. In other embodiments, the system 20 may be configured such that less than six numbers may be provided for the MIO dataset. Thus, where no proximity measurements 90 are detected in a particular direction, a null value or no value may be reported as part of the MIO dataset.

Figure 4:
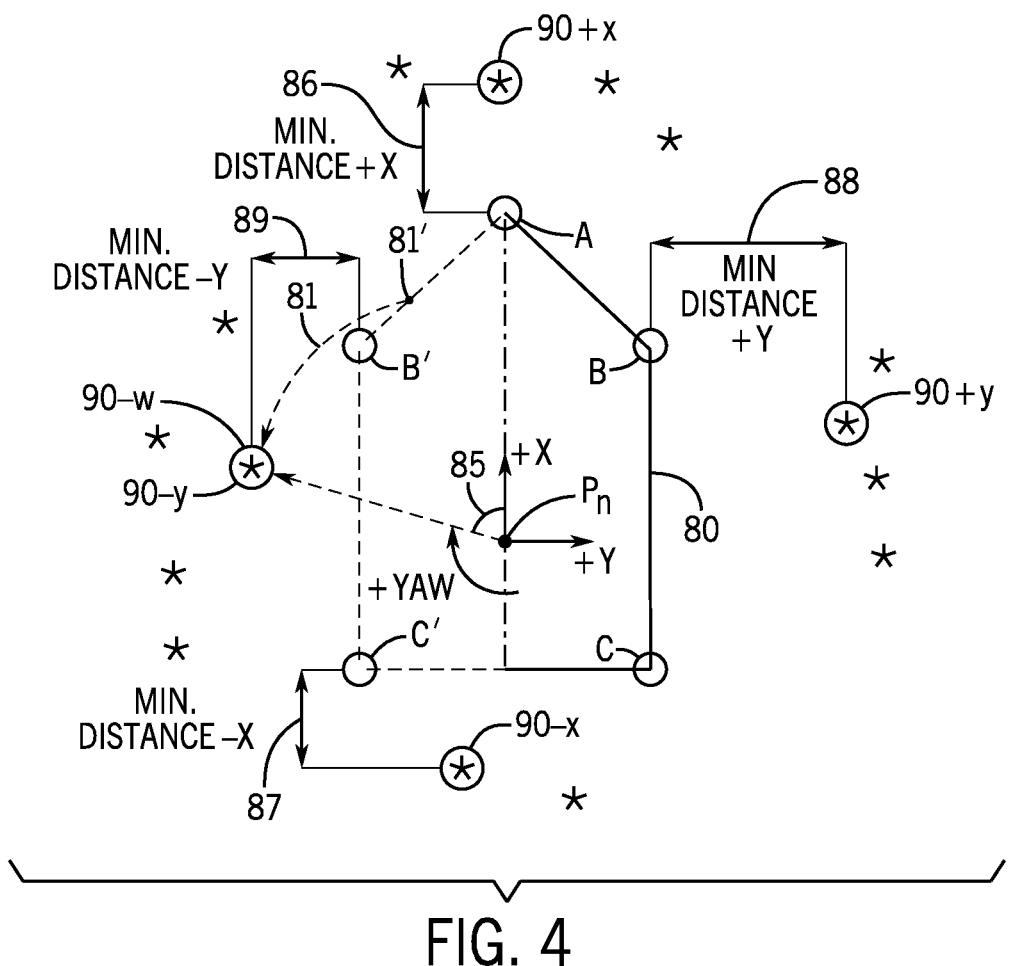
FIG. 4 is a diagram illustrating an exemplary calculation of a most important object (MIO) dataset identifying closest proximity measurements.

As illustrated in FIG. 4, the two-dimensional vessel outline may be represented as a set of Cartesian points defined with respect to a point of navigation $P_n$. For instance, the two-dimensional vessel outline may be a set of five points forming the shape of a pentagon around $P_n$, where the center point (00) is the navigation point $P_n$ (i.e., the center of navigation) of the marine vessel. Referring to the example at FIG. 2, the three Cartesian points include the front point A, starboard corner point B, starboard back point C, the port corner point B and the port back point C.

In FIG. 4, the two-dimensional vessel outline 80 is presented with respect to multiple proximity measurements 90. The four linearly-closest proximity measurements $90_{+x}$, $90_{-x}$, $90_{+y}$, and $90_{-y}$ are determined as the four closest proximity measurements in each direction along the x-axis and the y-axis, sequentially. For example, the proximity measurement with the minimum distance 86 in the positive x direction from the front-most point of the vessel model, the front point A, is determined as the closest proximity measurement $90_{+x}$. The proximity measurement 90 with the minimum distance 87 in the negative x direction as measured along the x-axis from the x-value of the back points C and C' is the closest proximity measurement $90_{-x}$. The proximity measurement 90 with the minimum distance 88 in along the y-axis from the y-value of starboard points B and C is the closest proximity measurement $90_{+y}$. The minimum distance 89 in the direction of the negative y-axis from the y-values of the port points B' and C' is the closest proximity measurement $90_{-y}$.

In addition to the linearly-closest proximity measurements, rotationally-closest proximity measurements may also be calculated, which are the closest proximity measurements in the positive yaw direction and the negative yaw direction. In other words, the rotationally-closest proximity measurements include the point that will first touch the two-dimensional vessel outline 80 as it rotates about the point of navigation $P_n$ in the positive yaw direction (clockwise) and the point that will first touch the two-dimensional vessel outline 80 as it rotates about $P_n$ in the negative yaw direction (counterclockwise). The two rotationally-closest proximity measurements may be used to identify the yaw angles to which the marine vessel can rotate without colliding with an object. The smallest positive yaw angle and smallest negative yaw angle may be included in the MIO dataset so that the vessel navigation controller can properly limit the movement of the marine vessel to avoid collision.

For those proximity measurements 90 near the marine vessel 10, at least one yaw path will be calculated between the respective proximity measurement and one or more intersection points on the two-dimensional vessel outline 80. Referring to FIG. 4, one or more yaw paths 81 will be calculated for each nearby proximity measurement 90, including each of the linearly-closest proximity measurements $90_{+x}$, $90_{-x}$, $90_{+y}$, and $90_{-y}$. For each yaw path 81 determined for each proximity measurement 90, a yaw angle 85 is determined, which may be a positive yaw angle or a negative yaw angle (depending on the path 81 of rotation). The smallest positive and negative yaw angles 85 are included in the MIO dataset as the closest positive yaw direction proximity measurement $90_{+w}$ and the closest negative yaw direction proximity measurement $90_{-w}$. For calculating the yaw path for each proximity measurement 90, a circle may be defined having a radius between the point of navigation $P_n$ and the respective proximity measurement 90. FIG. 4 represents one such calculation, where the proximity measurement circle is defined for calculating the yaw path 81. At least one intersection point 81' is identified between the proximity measurement path 81 and the two-dimensional vessel outline 80.

Velocity limits are then calculated based on the MIO dataset providing the closest proximity measurements in each of the +/−x direction, +/−y direction, and +/−yaw direction. For example, a velocity limit may be calculated for each point in the MIO dataset, thus resulting in continual calculation of a velocity limit in each of the +/−x directions, +/−y directions, and +/−yaw directions.

Figure 5A:
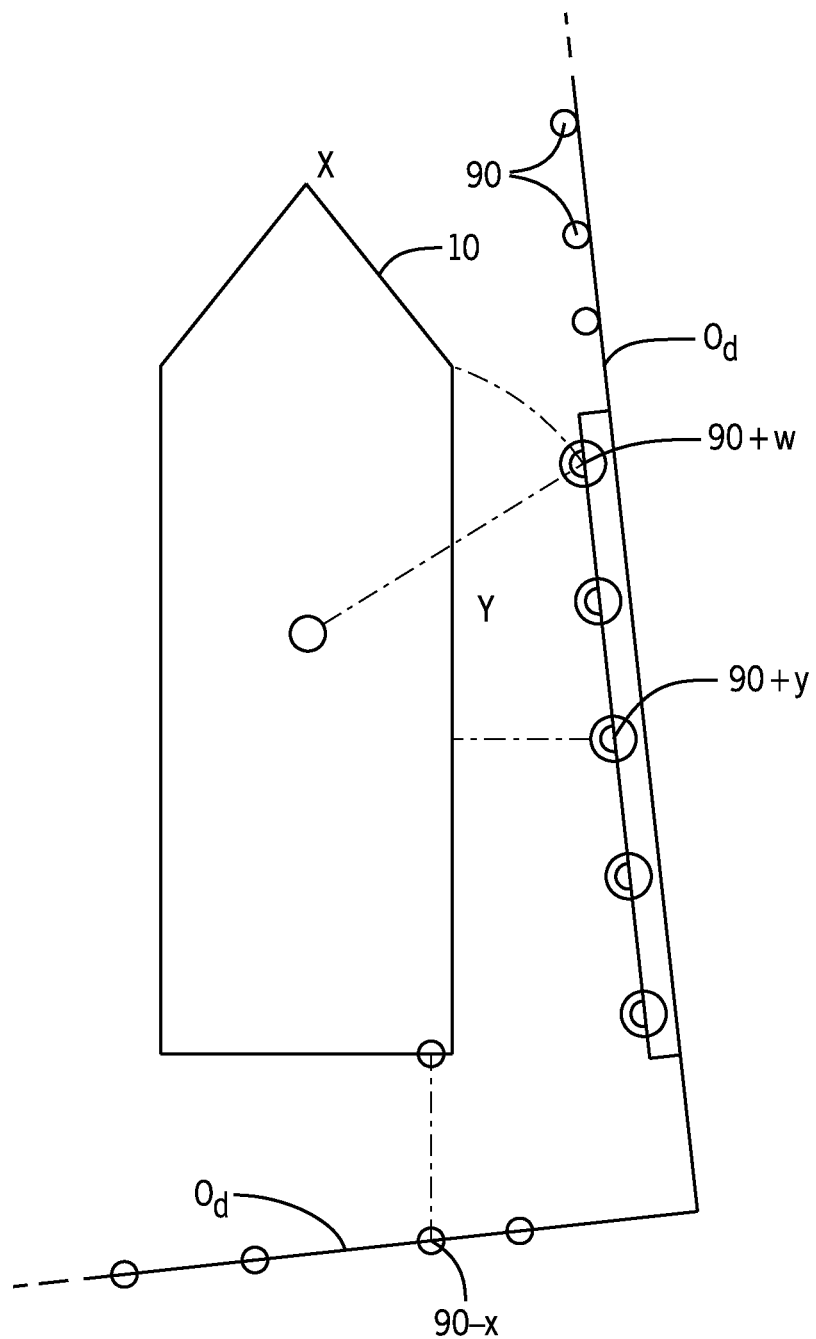
FIG. 5A illustrates an exemplary scenario where velocity limits are calculated in the direction of each of multiple objects.

In FIG. 5A, the marine vessel 10 is shown approaching the object $O_d$, which is a dock where multiple proximity measurements 90 are identified defining the dock. Several closest proximity measurements are also identified, including a closest proximity measurement in the negative x direction $90_{-x}$, a closest proximity measurement in the positive y direction $90_{+y}$, and a closest proximity measurement in the + yaw rotational direction $90_{+w}$. As the marine vessel 10 approaches the dock $O_d$, velocity limits are calculated based on those identified closest proximity points. Three exemplary velocity limits are illustrated, which include a negative x direction velocity limit, the positive y direction velocity limit, and the positive yaw rotational velocity limit. For example, each velocity limit may be calculated using the velocity limit formula described above, where Δr is each distance measurement adjusted by the preset buffer distance 50. The formula can be equally applied to rotational (yaw) velocity control by using angular velocity and acceleration instead of linear velocity and acceleration.

In certain embodiments, the marine vessel may be configured to autonomously control the propulsion devices 12a, 12b to maintain at least the predetermined buffer distance 50 between the marine vessel 10 and an object O. Thus, where the buffer zone 51 is violated, the relevant controller executing velocity control software 25, the propulsion controller, may generate instructions to the propulsion devices 12a, 12b to move the marine vessel such that the buffer zone 51 is not violated. Where an object O, such as a dock $O_d$ or seawall, spans the length of the marine vessel 10, positive and negative yaw direction limits will come into play, where zero or negative yaw velocity limits in one or the other direction will result in propulsion control instructions that rotate the marine vessel so as not to violate the buffer zone 51.

The positive and negative yaw direction limits and control instructions to maintain the buffer zone 51 will result in the marine vessel self-aligning with the object O, such as a seawall or a dock. The propulsion controller, such as the central controller 24 executing velocity control software 25, will operate to rotate the marine vessel to align with the dock $O_d$ because a thrust instruction causing rotation of the vessel will be generated if a portion of the marine vessel becomes closer to the object $O_d$ and thus violates a portion of the buffer zone 51. In such an instance, the relevant yaw velocity limit $90_{+w}$, $90_{-w}$ will become negative, which will result in a thrust instruction to rotate the marine vessel to move the closest end of the vessel away from the object. Referring to FIG. 5A, if the velocity limit $90_{+w}$ becomes negative, then the marine vessel 10 will be rotated counterclockwise until the proximity measurement $90_{+w}$ in the negative yaw direction is at least the buffer distance from the relevant object point. Thereby, the marine vessel 10 is caused to align with the length of the dock $O_d$ such that neither of the yaw velocity limits are negative. Accordingly, with respect to the scenario depicted in FIG. 5A, if an operator were to instruct lateral movement towards the object O, such as by holding the joystick 30 laterally toward the dock $O_d$, the propulsion controller would cause the marine vessel to self-align with the dock $O_d$ and to maintain a clearance from the dock equal to the preset buffer distance 50.

Similarly, where a marine vessel is being steered within a tight space, such as in a slip, the propulsion controller will operate to maintain the buffer distance on all sides of the marine vessel where the object O appears. Where the marine vessel is being positioned in a slip or a similar tight space, the buffer distance on two sides of the marine vessel must be violated. The controller 70 implementing the autonomous thrust instructions based on negative velocity limits, as described above, will act to center the marine vessel 10 within the objects appearing on either side. There, a negative thrust control will be generated based on objects on opposing sides of the marine vessel, such as both in the positive y direction and the negative y direction. Where the marine vessel ventures closer to the object on one side than the other, the negative thrust instruction in the opposite direction of the closer side will be greater than that generated in the opposite instruction. Thus, the thrust instructions generated from the negative velocity limits will only be executed if the marine vessel is closer to an object on one side than the other, and the velocity limits will tend to cancel each other out and cause the marine vessel to center within the objects on either side.

Figure 11:
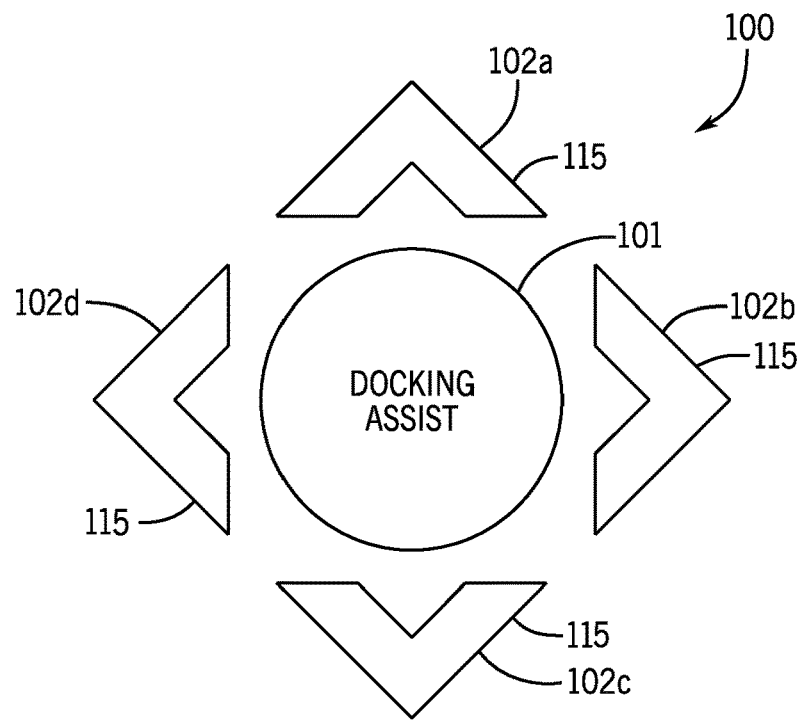
FIGS. 11-13 depict exemplary user input devices in accordance with various embodiments of the present disclosure.
Figure 12A:
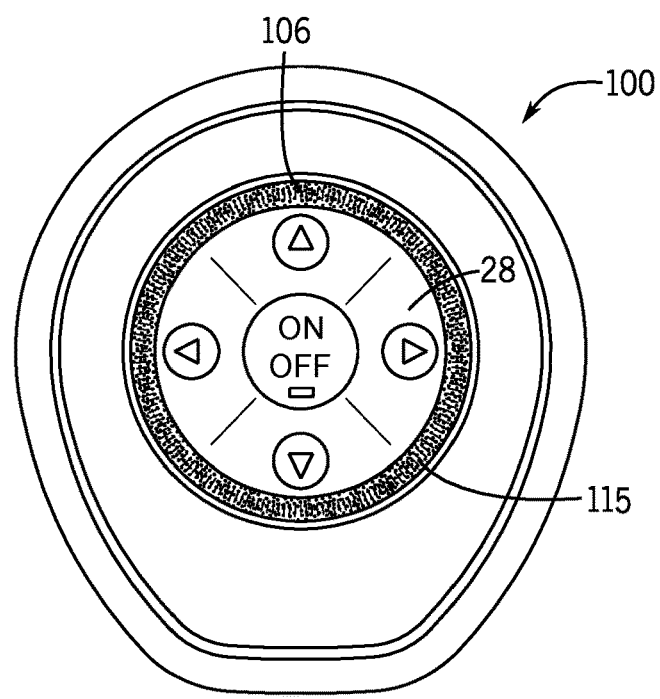
Figure 12B:
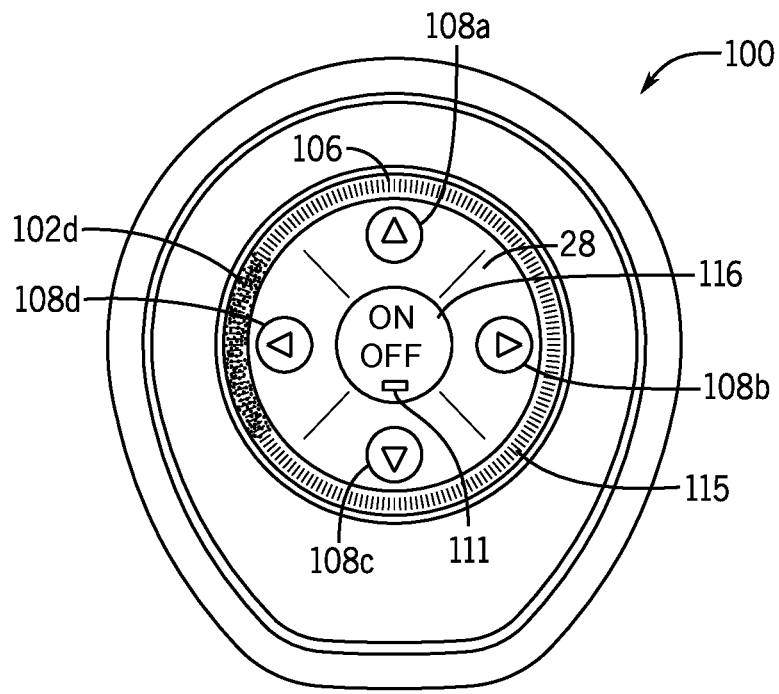
Figure 12C:
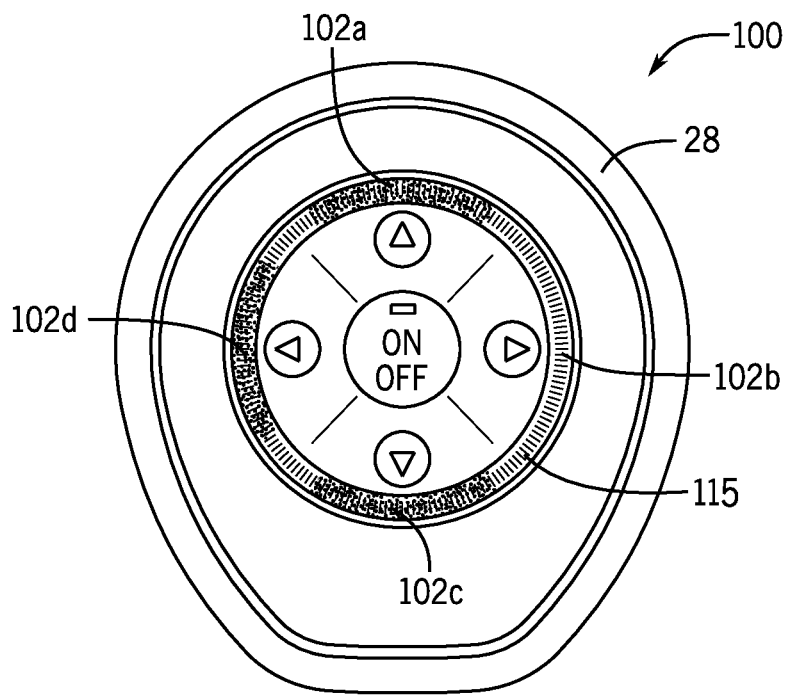
Figure 13:
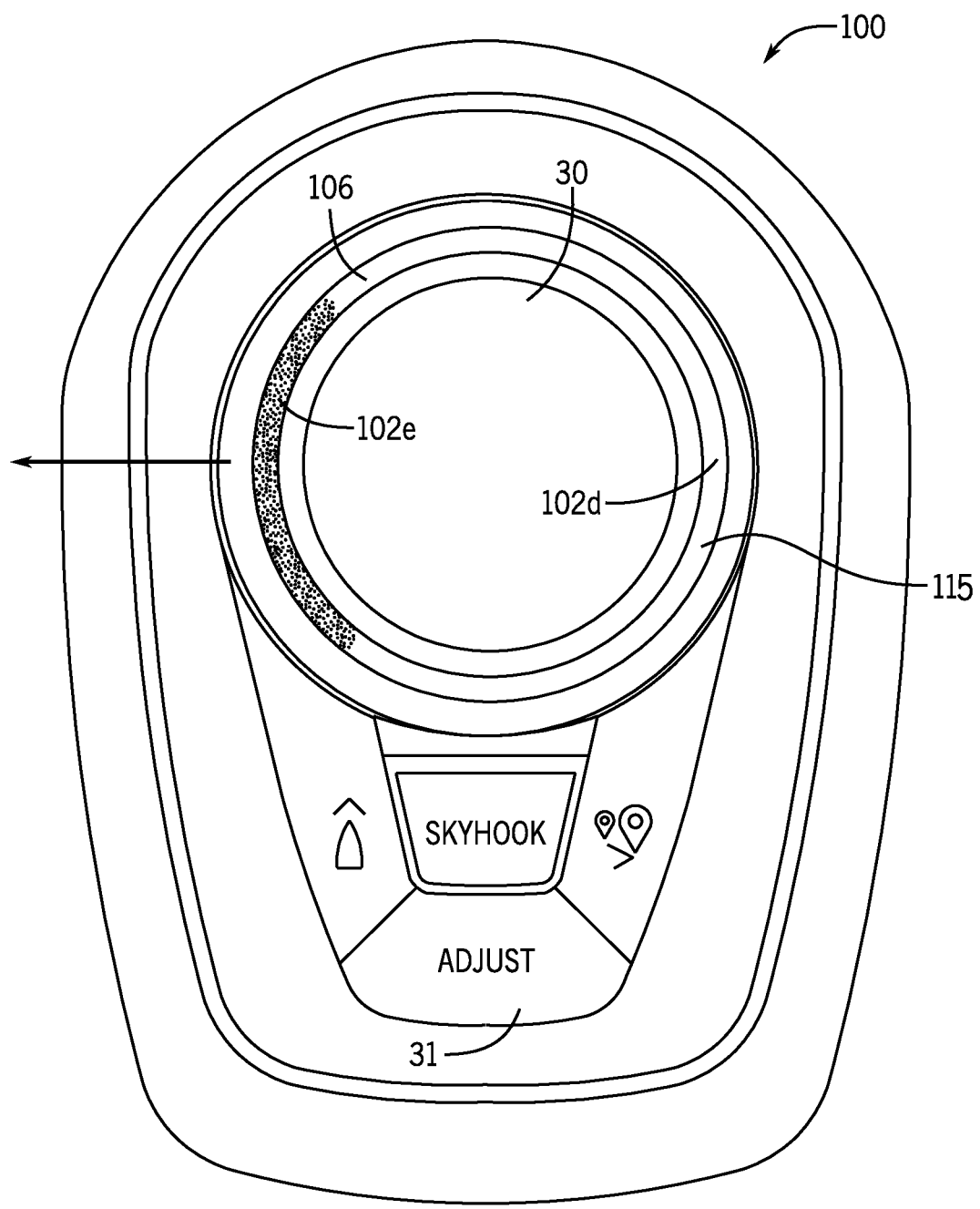

When the operator wants to suspend, or override, maintenance of the buffer distance by the propulsion control system 20, the operator provides input via a user input device on the operation console 22 such input may be provided, for example, via the user input devices described herein (see FIGS. 11-13). The user-generated instruction to suspend maintenance of the buffer distance 50 may be by any user input device or system that allows the operator to provide an intentional input that acknowledges that the marine vessel is near an object and that the operator intends to override the collision avoidance algorithm to allow the marine vessel to approach and impact the object O. For example, one or more buttons 31 may be provided on or near the joystick 30 that are depressible by the operator to suspend maintenance of the buffer distance 50 from an object O. In another embodiment, the user input option to suspend the buffer maintenance may be via the joystick, such as imposing a detent at some point in the movement range of the joystick 30 that the operator must overcome to suspend maintenance of the buffer distance 50 and move the marine vessel toward the object O.

Alternatively, the user input may be provided by other means. For example, the display 29 on the operation console 22 may be configured to present a user input option to the operator to suspend maintenance of the buffer distance 50 in one or all directions with respect to the marine vessel 10. In one embodiment, the display 29 may be controlled to present a user input option to suspend maintenance of the buffer distance 50 when the marine vessel is within a predetermined distance of the object O (e.g., dock $O_d$). In such an embodiment, the option to suspend the buffer zone may be presented or otherwise available to the operator when the marine vessel is at the buffer distance 50, or within a predetermined range of the buffer distance 50. In other embodiments, the option to suspend the buffer zone 51 entirely or the buffer distance 50 in select directions may be available any time that the user input authority is being limited below the maximum propulsion authority 54.

In certain embodiments, the user input device may allow the user to specify a portion, or side, of the marine vessel where the buffer maintenance will be suspended, or specify an object O that the marine vessel should be permitted to impact. For example, a user input device may allow an operator to select at least one of a port side, a starboard side, a rear side, or a front side of the marine vessel 10 at which the buffer distance will no longer be maintained. To provide one example, a display on the operation console 22 may present a schematic of the marine vessel allowing an operator to select, such as via touching the screen, one or more sides of the marine vessel where the control system 20 will permit the buffer zone 51 to be violated. In another embodiment, multiple buttons 31 may be provided on or near the joystick 30, each associated with a side of the marine vessel 10. The buttons may be individually selectable to allow the operator to select a side of the marine vessel where maintenance of the buffer distance 50 will be suspended by pushing the button 31 associated with that side. In still other embodiments described herein, selection of a side of the marine vessel 10 or other docking-related selection may be provided by movement of the joystick 30 (see FIG. 13).

In an embodiment where the user input device allows an operator, or user, to select a location for suspension of the buffer distance 50, the user-generated instruction provided to the control system by the user input device will then specify the location for suspension selected by the user. Only a portion of the buffer zone 51 will be suspended, and the buffer distance 50 will be maintained on all other sides of the marine vessel as described above. Thereby, the control system 20 will act on the user control input, or in some embodiments autonomously, to propel the marine vessel toward the object O while still avoiding objects in the non-selected directions. Referring to FIG. 5A, for example, where the operator selects to approach the dock $O_d$ on the starboard side, the propulsion controller may still operate to maintain the buffer distance between the dock and the vessel 10 on the rear side (i.e., in the negative x direction).

Alternatively, the system 20 may be configured to suspend maintenance of the buffer zone 51 altogether such that the buffer distance 50 is no longer maintained on any side of the marine vessel 10. In still other embodiments, the control system 20 may be configured to automatically determine which side to suspend the buffer distance 50 based on the detected objects and the direction of the user control input directing propulsion of the marine vessel. Thus, if the operator is providing a propulsion control input to move the marine vessel in the direction of the object O, and the object is within a predetermined distance, the propulsion controller may interpret the user-generated instruction as an instruction to suspend maintenance of the buffer distance 50 in the direction of the object O.

In response to the user-generated override instruction, the control system 20 will act on the user control input to propel the marine vessel toward the object O and allow the marine vessel 10 to impact the object O in a controlled way. In certain embodiments the propulsion controller may continue to employ the velocity controls described herein to limit the user input authority over how quickly the marine vessel 10 can approach the object O. The propulsion controller may be configured to suspend maintenance of a portion of the buffer zone 51 in response to the user-generated instruction by changing the buffer distance on the respective side of the marine vessel. Thereby, the buffer distance algorithm can continue to run and the buffer distance 50 will be maintained on all other sides of the marine vessel, but the operator will have limited authority to approach and impact the object O.

Figure 5B:
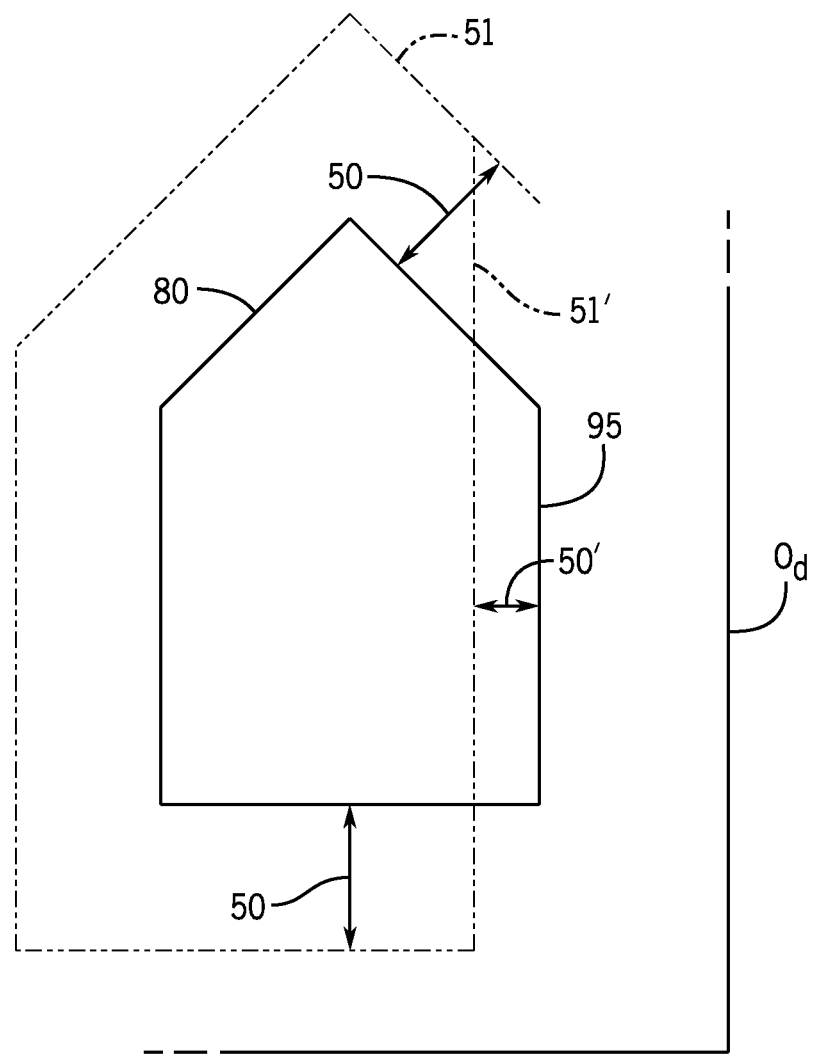
FIG. 5B illustrates an exemplary modified buffer zone used to impose velocity limits that permit the marine vessel to approach and impact an object.

FIG. 5B illustrates one such example employing the vessel outline 80. The modified buffer distance value 50' on the starboard side 95 of the vessel outline 80 (which corresponds to the starboard side of the marine vessel 10) is changed from the original buffer distance 50. Thus, the velocity limit calculations on the starboard side of the marine vessel will permit the marine vessel 10 to approach and impact the dock $O_d$. In the depicted embodiment, the modified buffer distance value 50' on the starboard side 95 is changed to a negative number such that the line for that portion 51' of the corresponding side buffer zone 51 is moved to inside the starboard side of the marine vessel 10. Thereby, the modified buffer distance value 50' gets added to the proximity measurements 90 for the object $O_d$ on that side of the marine vessel 10. This essentially makes the control system think that the dock $O_d$ is further away than it actually is and to calculate the velocity limits accordingly. While limited, the operator still has propulsion authority to move the marine vessel 10 toward the object O, even when the marine vessel is contacting the object. The greater the magnitude of the modified buffer distance value 50', and thus the further inward from the starboard side 95 of the vessel outline 80, the more authority will be available to the operator, or user, to allow the marine vessel 10 to approach and impact the object $O_d$.

In other embodiments, the modified buffer distance value 50' on the selected side 95 of the marine vessel may be changed to zero. This puts the buffer distance exactly at the starboard side 95 of the vessel outline 80. In such an embodiment, the velocity limit will be zero at the point where the starboard side 95 reaches the edge of the object $O_d$. Thus, when the proximity sensor system determines that the distance between the marine vessel 10 (e.g. represented by the vessel outline 80) is zero, the operator will not have any authority to move the marine vessel 10 further toward or against the object O. Such an embodiment may be insufficient for certain vessel configurations or dock configurations, where the portion of the marine vessel 10 from which passengers embark and disembark may not be close enough to the dock $O_d$. In those situations, providing a negative modified buffer distance value 50' may be more desirable so that the operator, or user, has some authority to maintain the marine vessel 10 against the dock $O_d$. Exemplary methods for calculation of velocity limit control and implementation of a user-generated instruction to suspend maintenance of the buffer distance are presented and described below with respect to FIGS. 6 and 7.

In certain embodiments, an alert may be generated notifying the user that the buffer distance is no longer being maintained. The alert may, for example, specify the direction or side of the vessel where the buffer distance 50 is modified or eliminated, thereby advising the user that collision with an object on that side is possible or likely. In various examples, the alert may be provided via the display 29, such as a text or graphic alert displayed thereon. Alternatively or additionally, the alert may be provided via the joystick, such as by haptic and/or visual means. For example, the joystick may include a direction indicator display 115 as described herein, which includes one or more light indicators that illuminate to correspond with and indicate directions or side(s) of the vessel where the buffer distance is no longer being maintained.

The velocity limit calculation is executed by one or more controllers with the control system 20. Referring again to FIG. 1, the sensor processor 70 receives the proximity measurement from each of the proximity sensors 72-78, and in such an embodiment may be configured with software to perform the MIO dataset identification and may provide the MIO dataset to a controller performing the velocity limit calculation. The controller performing the velocity limit calculation is referred to herein as the propulsion controller, which may be any controller configured to execute velocity control software 25 having computer-executable instructions to cause that controller to perform as described herein. In FIG. 1, the propulsion controller may be, for example, the CCM 24 storing and executing velocity control software instructions 25. In such an embodiment, each of the sensor processor 70 and the central controller 24 includes its own storage system comprising memory and its own processing system that executes programs and accesses data stored in the respective storage system.

In other embodiments, the sensor processor 70 may store and execute the velocity control software 25 and thus may perform as the propulsion controller. In still other embodiments, a dedicated, special-purpose propulsion controller may be provided, such as a computing system storing and executing the velocity control software 25 and configured to receive proximity measurements, such as from the sensor processor 70, and to output velocity limits, which in various embodiments may be provided to the CCM 24 or to each PCM 26a, 26b. In still other embodiments, the proximity assessment functionality described herein as belonging to the sensor processor 70 and the velocity control functionality may both be performed by a single controller, such as the central controller 24.

Given the large amount of proximity data produced by the proximity sensors 72-78, the connection between the sensors 72-78 and the sensor processor 70 may be via a dedicated bus or network connection. This dedicated bus or network connection is separate from the vessel network in order to allow transmission of a large amount of proximity measurement data (and, in some embodiments, IMU data) to the sensor processor 70. Such massive data transmission may not be possible on a typical vessel network, such as a CAN bus or wireless network where multiple devices are communicating. The sensor processor 70 may be configured to communicate filtered proximity data on the vessel network, such as a CAN bus or wireless network, such as the MIO dataset. In still other embodiments, a dedicated communication link may be provided between the sensor processor 70 and the propulsion controller, such as the central controller 24.

Figure 6:
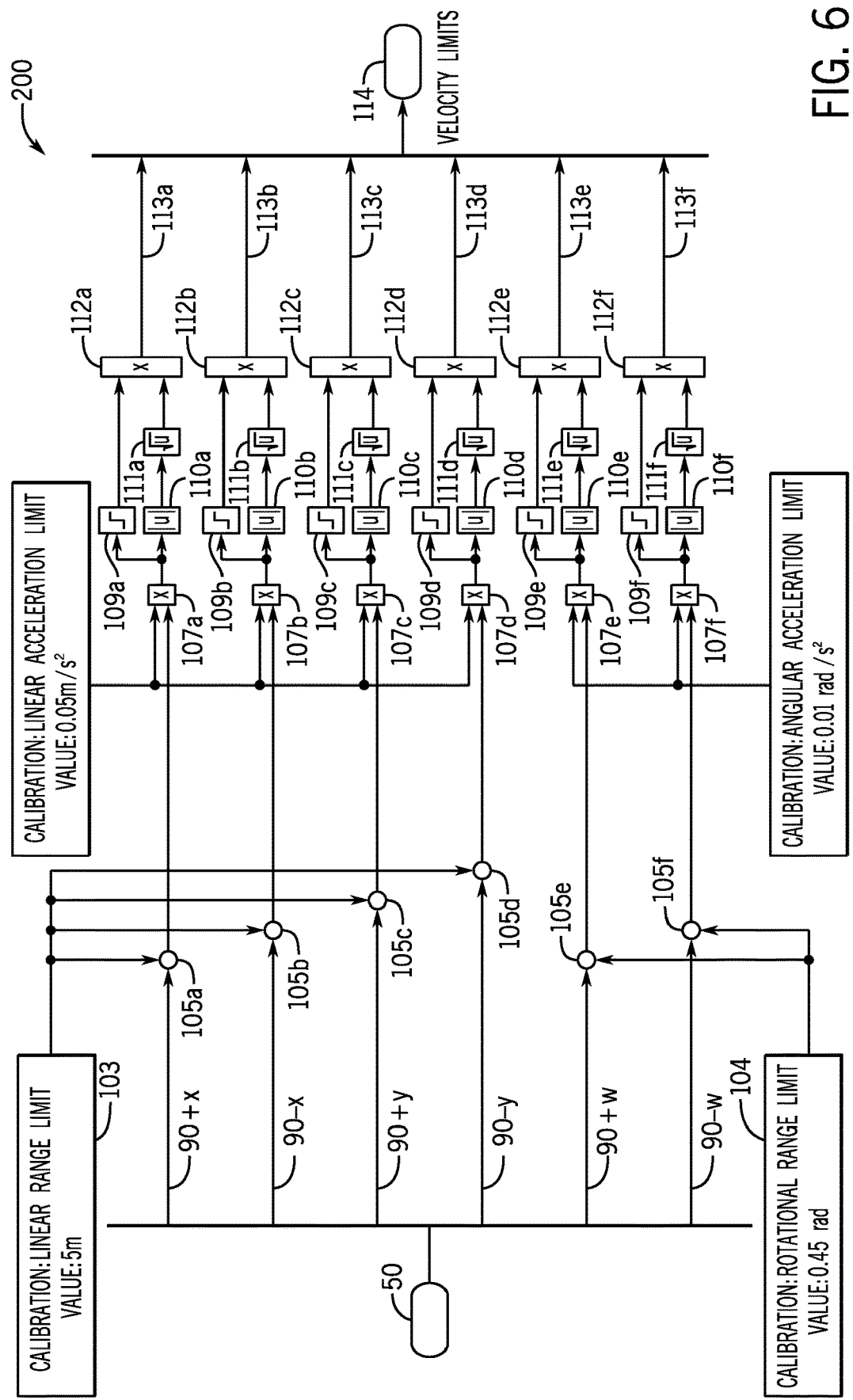
FIG. 6 is a flowchart exemplifying velocity limit calculations according to one embodiment of the disclosure.

FIG. 6 depicts one embodiment of a propulsion control method 200 implementing proximity-based velocity limiting as described herein. Six closest proximity measurement values are provided, one in each of the +/−x direction, +/−y direction, and +/−yaw direction. The preset buffer distance 50, or "minimum range" that must be maintained from an object, is defined and provided, where the linear range limit is provided at block 103 and the rotational range limit is provided at block 104. In the example, the linear range limit is 5 m. Note that the range limit in the angular direction is an angular measurement, which in the example is 0.45 radians. The minimum range is then either added or subtracted from the respective distance value depending on the direction (and thus the sign) of the respective distance value. Summing blocks 105a-105f are each configured to assign the appropriate sign to the preset buffer value.

The velocity limit is then calculated accordingly based on the distance values and the maximum acceleration set for the marine vessel. In the example, the linear maximum acceleration is 0.05 m/s$^2$ and the angular acceleration limit is 0.01 rad/s$^2$. The maximum linear acceleration is provided to each of blocks 107a-107d, which is the maximum acceleration in the relevant Cartesian direction. Similarly, the maximum angular acceleration is provided to each of blocks 107e and 107f, which is the maximum acceleration in the relevant positive or negative yaw direction. At block 107 the relevant distance range (e.g., Δr described above) is multiplied by the corresponding maximum acceleration. Before the absolute value is taken of the outputs at blocks 110a-110f, the sign of the relevant velocity calculation is determined at signum function blocks 109a-109f. The square root of the absolute value is then calculated at blocks 111a-111f. The velocity limit is then determined at blocks 112a-112f for each of the six directions, and all six velocity limit values 113a-113f are outputted at block 114.

Figure 7:
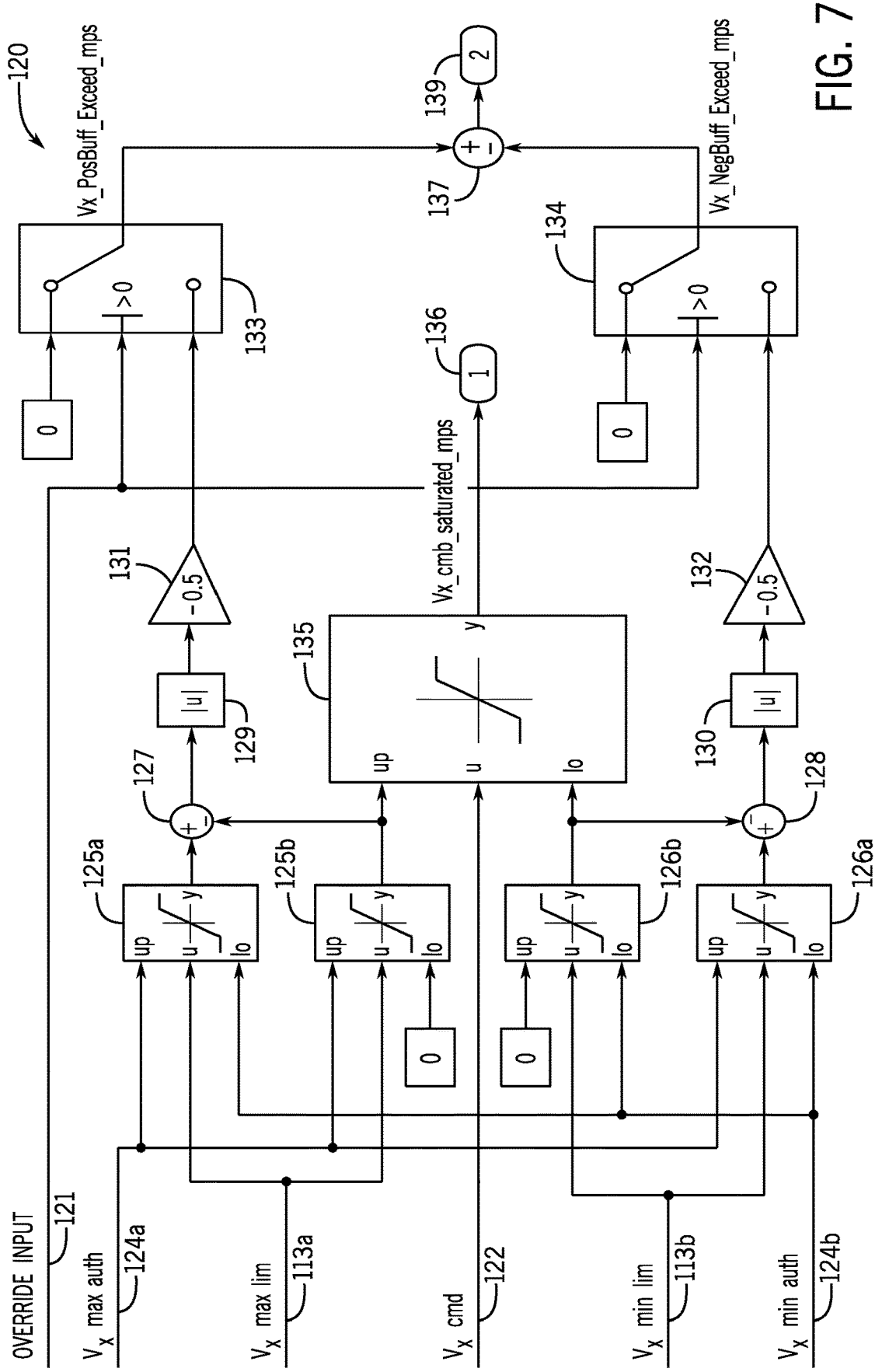
FIG. 7 is a flowchart exemplifying calculation of a velocity command in a direction of an object based on a velocity limit.

FIG. 7 depicts an exemplary method 120 of velocity limit implementation. FIG. 7 exemplifies velocity command determination in the positive and negative x directions based on the +/−x velocity limits 113a and 113b. The velocity limit is calculated based on the user control input 122, such as via the joystick 30. In the depicted example, a positive or negative x-direction propulsion command is determined based on the user control input 122 (which in the depicted embodiment is an initial velocity value associated with the joystick position), +/−x velocity limits 113a and 113b, and the maximum propulsion authority values 124a and 124b in the positive and negative x directions. If the user control input 122 is positive, then a positive x direction propulsion command is generated; if the user control input 122 is negative, then a negative x direction command is generated. In the depicted example, the velocity limit values 113a-113f are unbounded values calculated based on the respective closest proximity measurement. The calculated velocity limits 113a or 113b is limited, or capped, based on the maximum propulsion authority 124a, 124b at blocks 125a, 125b and 126a, 126b. In particular, a capped velocity limit in the positive x direction is calculated at blocks 125a and 125b. At block 125a, the velocity limit is bounded by both the positive and negative x-direction authority values 124a and 125b, meaning that the velocity limit outputted from block 125a may be negative where the marine vessel is less than the buffer distance from the object. At block 125b, however, the velocity limit is bounded between the maximum authority 124a in the positive x direction and zero, meaning that the outputted velocity limit will be zero when the proximity measurements are less than or equal to the buffer distance. The negative x direction capped velocity limit determinations are similar, where capped velocity limits in the negative x direction are calculated at blocks 126a and 126b. Note that the output of block 126b will be negative or zero depending on whether the proximity values are outside or inside the buffer zone, and the output of block 126a may be negative, zero, or positive depending on whether the proximity values are outside, at, or inside the buffer zone.

The outputs of blocks 125b and 126b, which are the zero-bounded velocity limits, are provided to block 135, where they are implemented to limit the user control input 122. Depending on the sign of the user control input 122, either one of the positive velocity limit 125b or the negative velocity limit 126b is used at block 135 to limit the user input authority. The resulting velocity command based on the user control input 122 is outputted at block 136. In an embodiment where no autonomous control is implemented, only this zero-bounded portion of the control diagram may be implemented to deprive the user authority to move the marine vessel closer to the object O than is permitted.

In an embodiment where autonomous control is provided, the output of blocks 125a and 126a may be utilized to determine an autonomous velocity command. The outputs of blocks 125a and 125b or 126a and 126b are summed at blocks 127 and 128, respectively. If the buffer zone is not violated, then the outputs of the summed blocks will cancel each other out and the output of the summation blocks 127 and 128 will be zero. If the output of the summation block 127, 128 is non-zero, then the buffer zone has been violated and a propulsion command is calculated to move the marine vessel away from the object. The absolute value of the respective summed output is determined at blocks 129 and 130, and a negative gain is applied at blocks 131 and 132. Blocks 133 and 134 are provided to implement a user override, where the autonomous propulsion control to actively maintain the buffer distance is suspended when the user-generated instruction 121 is active, or positive, by setting the output of blocks 133 and 134 to zero. Assuming that the user-generated instruction 121 is not active, the output of block 133 or 134 (whichever is nonzero) is provided to block 137, which reapplies the relevant sign to generate a propulsion command in the correct direction. The resulting propulsion command is outputted at block 139.

Thus, in embodiments where the buffer distance is modified in response to the user-generated instruction 121, the control algorithm continues to operate the same. However, on the side where the buffer distance is changed, the modified buffer distance value 50' will be a negative number and will be additive to the proximity measurement $O_d$. Thereby, the calculated velocity limit 113 on the relevant side (e.g. the starboard side in the example of FIG. 5B) may be higher than the velocity limits in the other directions such that the marine vessel 10 will be allowed to approach and impact the object on the relevant side in response to user control inputs to move the marine vessel in the direction of the object. In other embodiments, the control system may operate differently in response to the user-generated instruction to suspend maintenance of the buffer distance 50. For example, the propulsion controller (e.g., CCM 24) may be configured to apply a preset velocity limit for operation within the buffer zone in response to the user-generated instruction. In such an embodiment, the preset velocity limit will be relatively low so as to provide a controlled approach and impact with the object $O_d$.

One such embodiment may be by scaling and/or offsetting the user control input via the user input device, such as the joystick 30. For instance, the user control input 122 from the joystick 30 may be multiplied by a percentage, such as 20%. Thereby, the imposed velocity limit would be 20% of the maximum velocity associated with the maximum joystick position. In certain embodiments, the rescaled output may only be applied in the direction of the object O, and user input commands in other directions (such as away from the object O) may be provided without such limitations.

Figure 8:
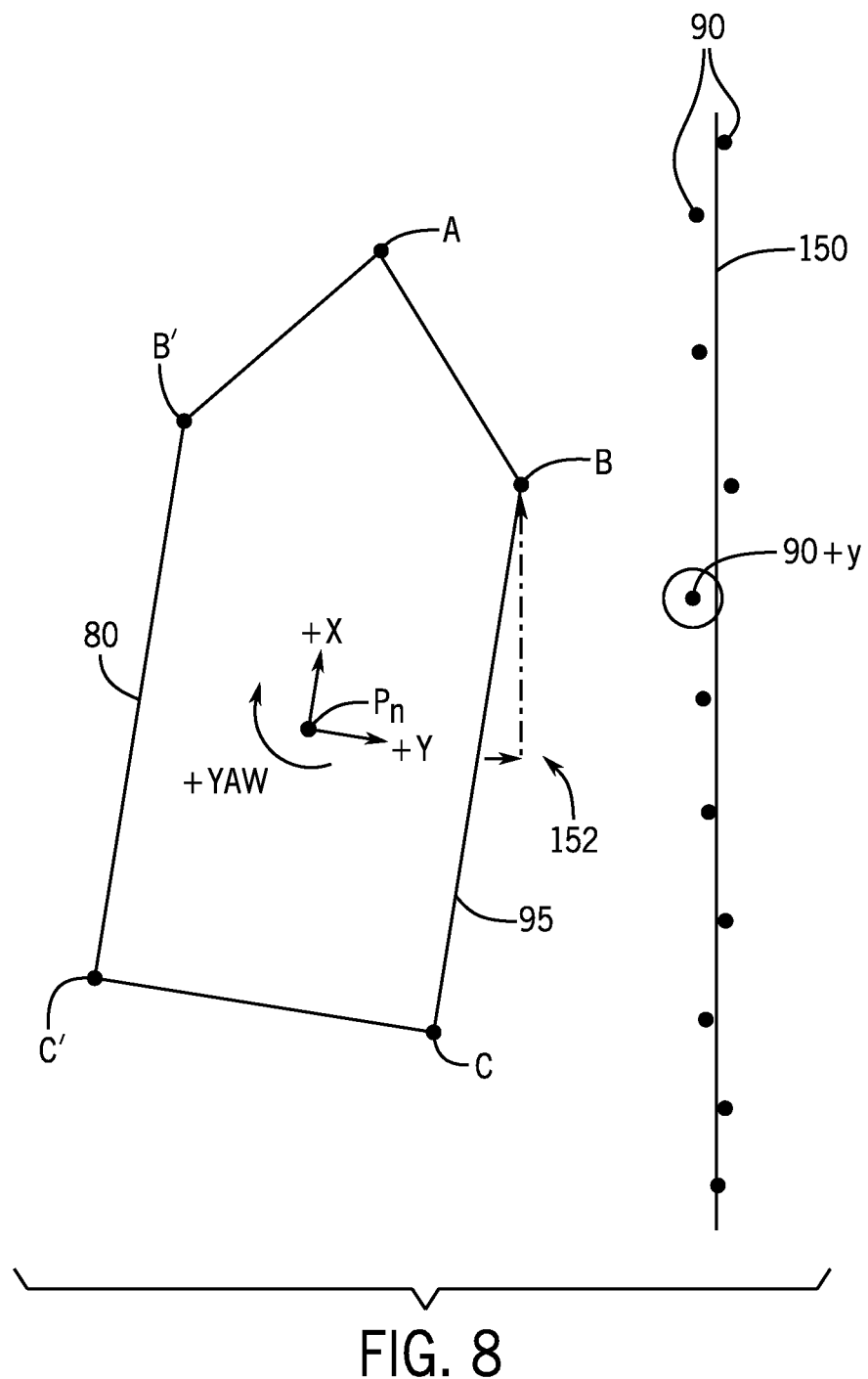
FIG. 8 illustrates one embodiment of a method for controlling propulsion of a marine vessel in an autonomous docking mode.

In certain embodiments, the propulsion control system 20 may be configured to provide certain automatic propulsion control functionality, or autonomous modes, where the system automatically controls propulsion based on proximity measurements by the proximity sensors 72-78, such as to autonomously navigate the marine vessel during docking (i.e., autonomous docking) and launch (i.e., autonomous launch) maneuvers with respect to a docking surface. FIG. 8 illustrates exemplary autonomous docking control functionality—i.e., auto-docking. In certain embodiments, the controller 24 may be configured to identify potential docking surfaces based on the proximity measurements 90 by the various proximity sensors 72-78. Identifying the potential docking surface may include identifying a linear relationship between a group of proximity measurements 90 located in a particular area. In one example, a potential docking surface 150 is identified based on the multiple proximity measurements 90 having a threshold linear relationship with respect to one another.

In one embodiment, the potential docking surface 150 may be identified, or represented, as the best fit line based on relevant proximity measurements 90. For example, the controller 24 may be configured to identify and assess proximity measurements adjacent to or near each of the points in the MIO dataset to determine whether such a linear relationship exists. For example, the MIO dataset may be six values specifying one closest proximity measurement in each of the +/−x directions, +/−y directions, and +/−yaw rotational directions. In the example at FIG. 8, the marine vessel is approaching a docking surface on the starboard side, and thus multiple proximity measurements 90 align along that side. The closest proximity measurement $90_{+y}$ in the starboard direction may first be located, and then the linear relationship determination made therefrom. In other embodiments, all proximity measurements within a predetermined distance, such as calculated based on the simplified vessel outline 80, may be assessed to detect a linear relationship that represents a potential docking surface.

Upon identification of one or more potential docking surfaces 150 around the marine vessel, a user input device may be controlled to present a user with options to engage auto-docking with respect to one or more of those potential docking surfaces. Exemplary user interfaces configured for such purposes are disclosed herein (e.g., FIGS. 11-13). Once a user selection is received to engage auto-docking with respect to a docking surface 150—e.g., by receiving a direction selection at a user input device 100 as described herein—the controller may execute instructions to align the marine vessel 10 with the selected docking surface or surfaces and/or to move the marine vessel toward the docking surface 150 such that it gently impacts the dock. Velocity control is provided for such maneuvers based on the proximity of the docking surface and/or the needed alignment adjustment.

For example, the velocity may be calculated using methods similar to those shown and described above in FIGS. 6 and 7, replacing the propulsion control user input with controller-determined instructions for aligning the marine vessel with the dock at the buffer distance and then moving the marine vessel up against the dock, which are angular and linear distance-based velocity determinations. In one such embodiment, the controller 24 operating in the auto-docking mode may be configured to determine a velocity command based on the maximum velocity calculated by the velocity control software 25. For instance, the controller 24 may be configured to move the marine vessel at a velocity equal to the velocity limit, or at some predetermined percentage of the calculated velocity limit, such as 75% or 50% of the velocity limit. In other embodiments, a predetermined velocity instruction may be effectuated, such as to move the marine vessel at a preset velocity toward the selected docking surface.

In one embodiment, the controller 24 first aligns the marine vessel with the selected docking surface or surfaces. The controller 24 may be configured to maintain at least the buffer distance 50 between the docking surface 150 and the vessel outline 80 during the alignment process. In one embodiment, the alignment between the marine vessel 10 and the docking surface 150 may be determined utilizing the vessel outline 80. A relevant side of the vessel outline 80 may be identified as the docking side, such as the side closest to the selected docking surface 150 selected by the user. In the depicted example, the docking surface 150 is on the starboard side of the marine vessel. Thus, the starboard side 95 of the vessel outline 80 (between the Cartesian coordinates of points B and C) is utilized for determining vessel alignment, where the docking surface 150 is also plotted with respect to the same coordinates centered on the point of navigation $P_n$. Alternatively or additionally, the rear side or front side of the vessel outline 80 could be selected. Where the front side is selected via the user input device 100, the controller 24 may be configured to identify a docking surface off the bow of the vessel 10 and to reference the y-axis for assessing alignment. In certain examples, the controller 24 may be configured to align and approach the docking surface head-on and gently impact the docking surface 150 with the tip of the bow (e.g., point A of the vessel outline 80). In other embodiments, the controller 24 may be configured to select either the port or starboard side of the front end of the marine vessel 10 (e.g., based on the location of the docking surface relative to the vessel, such as the MIO angle, and/or based on a user input) and to align and approach the docking surface 150 accordingly.

Alignment between the selected docking surface 150 and the relevant portion of the vessel outline 80 is determined, such as the relative slope 152 of the selected side 95 of the vessel outline compared to the docking surface 150. Propulsion control instructions are determined to bring the docking side 95 of the vessel outline 80 parallel with the selected docking surface 150. In the example depicted at FIG. 8, the propulsion controls would be determined to effectuate a thrust in the −yaw direction until the slope 152 between the docking side 95 and the selected docking surface 150 is minimized, such as where the magnitude of the slope is less than a threshold slope representing alignment.

Once alignment is reached, propulsion is controlled to move the marine vessel 10 toward the selected docking surface 150. Thus, the marine vessel is moved in a direction perpendicular to the selected side of the vessel outline 80. In the depicted example, the selected docking surface 150 is the starboard side 95 and thus the marine vessel 10 would be moved laterally in the starboard direction maintaining its parallel alignment with the selected docking surface 150. The velocity calculation may be performed in various ways. In one embodiment described above with respect to FIG. 5B, the buffer distance 50 on the relevant side may be moved inward. For example, the buffer distance on the docking side 95 may be moved to the location of the docking side 95 (where the buffer distance 50' is set to 0), or the relevant portion of the buffer zone 51 may be moved to inside of the vessel outline 80 (buffer distance 50' is equal to a negative number). The velocity of the marine vessel is then calculated based on that modified buffer zone 51 in accordance with methods described herein. Thus, as the marine vessel 10 approaches the selected docking surface 150, the velocity command decreases such that the marine vessel will gently impact the selected docking surface.

In other embodiments, the controller 24 may access predetermined velocity commands, such as to effectuate a predetermined velocity command sequence. For example, the sequence may be determined and executed where the marine vessel 10 is at the buffer distance 50 from an object, where the controller 24 is configured to bring the marine vessel 10 up to the buffer zone 51 and into alignment, and then to close the buffer in a predetermined way. The controller may have predetermined velocities or predetermined velocity sequences that are selected and executed based on the docking side being utilized, such as a different velocity sequence when docking on the starboard or port sides versus on the rear side or front side.

In certain embodiments, the controller 24 and the user input device(s) 100 for providing docking-related control functionality, such as a joystick 30 or keypad 28, may be configured to allow a user to select two perpendicular docking surfaces and to position the marine vessel 10 with respect to the selected perpendicular docking surfaces. In such an embodiment, the user input device 100 displays all potential docking surfaces identified around the marine vessel 10. For example, the user interface or user input device 100 may visually depict multiple potential docking surfaces by illuminating or otherwise presenting direction indicators to indicate the direction of the potential docking surfaces with respect to the marine vessel.

FIGS. 11-13 depict exemplary user input devices 100, which in various examples may include a keypad 28, a joystick 30, a visual representation on a display 29 (such as a touchscreen), or by various user interface means. FIG. 11 depicts an exemplary user input device 100 (or user interface on a digital display) configuration, where a center portion 101 of the interface functions to activate and deactivate (on/off) available autonomous or semiautonomous control functionality, such as autonomous docking or autonomous launch, and/or to indicate the control functionality that is available and/or active (e.g., via the LED indicator). A direction indicator display 115 includes direction indicators 102a-102d positioned on each side of the center portion 101 to indicate directions of potential and/or selected docking surfaces 105 and/or to indicate the operation of the control system with respect to certain docking surfaces.

FIGS. 12A-12C depict one embodiment where the user input device 100 is a keypad 28 surrounded by a direction indicator display 115 that is an illuminable ring 106. The illuminable ring 106 is illuminable in quadrants to indicate a direction with respect to the marine vessel, such as a direction of potential and/or selected docking surfaces 105 with respect to the marine vessel 10. FIGS. 12B and 12C depict examples where select direction indicators 102 are illuminated on the direction indicator display 115. The direction indicator 102 illumination may be controlled to communicate various options and available control functionalities to the user, depending on the control mode. In the example at FIG. 12B, one direction indicator 102d is illuminated, which may indicate a direction of a potential docking surface 105—i.e., toward the port side of the marine vessel. The direction indicator 102 on the illuminable ring 106 may be provided by illuminating a quadrant or portion of the ring, which may be by blinking or pulsing the illumination. In the examples, the keypad 28 includes a center key 116 depressible to engage and disengage the docking control functionality relating to detecting and indicating potential docking surfaces and engaging autonomous or semiautonomous docking control.

In certain embodiments, the keypad 28 version of the user input device 100 may provide keys 108a-108d associated with the direction indicators 102a-102d operable to provide user input for directional docking control. For example, where a direction indicator 102a-102d is illuminated to indicate a direction of a potential docking surface 105, receipt of user input at the key 108a-108d associated with the illuminated direction indicator may be interpreted as a user input to select a docking surface 105 for docking.

In certain embodiments, the user input device 100 and controller 24 associated therewith may be configured to allow multiple user inputs to engage different control modes with respect to a potential and/or selected docking surface. For example, the controller 24 may be configured to interpret a first type of key press (such as a short key press) as a user input to select a docking side on which to suspend maintenance of the buffer zone 51. As described above, suspending maintenance of the buffer zone 51 on a selected side allows a user to provide control inputs to effectuate movement of the marine vessel 10 toward a docking surface and to impact that docking surface. In certain embodiments, the same keypad 28 may be utilized to engage auto-docking control functionality with respect to a potential docking surface 105. For example, a long key press of one of the directional keys 108a-108d may be interpreted by the controller 24 as a user input to engage auto-docking with respect to a selected docking surface in the direction indicated by the selected key 108a-108d. Accordingly, the direction indicators 102a-102d indicating a potential docking surface may similarly present and auto-docking option indicating the direction of the potential docking surfaces 105 and thus the options for which autonomous docking functionality is available.

As described below, the direction indicators 102a-102d on the direction indicator display 115 may serve different functionality depending on the current control mode, such as to indicate the directions for which the buffer zone 51 is active. Referring to FIG. 12C, for example, direction indicators 102a, 102c, and 102d are illuminated. In certain embodiments, this may indicate the locations of potential docking surfaces 105. In other embodiments, the illuminated direction indicators 102a-102d may indicate the directions with respect to the marine vessel 10 for which the buffer zone 51 is being maintained. In certain embodiments, where a marine vessel is docked against a docking surface 105, the direction indicator 102 may not be illuminated on the docking side to indicate that the buffer zone on that side of the marine vessel is not active. In other embodiments, the direction indicator 102 on the side where the buffer zone 51 is inactive (e.g., 102*b* in FIG. 12C) may blink or be presented differently than those direction indicators (e.g., 102*a*, 102*c*, 102*d*) that are illuminated to indicate a direction for which the buffer zone is active.

Once the auto-docking or buffer zone suspension is selected by a user, the direction indicator 102*a*-102*d* on the selected side may be changed to indicate the current control functionality being executed. For example, the direction indicator 102*a*-102*d* on the selected docking side of the marine vessel may blink, pulse, change color, change shape, or otherwise indicate the control mode and the docking surface for which the control mode is active. The user input device 100 also includes a visual indicator 111 to indicate whether the docking control system is on or off. In the example at FIGS. 12A-12C, the visual indicator 111 is a light indicator that illuminates when the docking related sensing and control functionality is active. In other embodiments, the visual indicator 111 may be by other means and may provide more detail regarding the current control mode, selected functionality, or the like.

In another example, the user input device 100 may be a visual depiction on the digital display 29, such as a touchscreen display. The center portion 101 may display details regarding the selected and/or available docking modes. The direction indicators 102*a*-102*d* may be selectable by touching the relevant screen portion to select a docking surface 4 auto-docking and/or semi-autonomous docking where limited user input authority is provided to allow a user to provide control input to dock the marine vessel 10. The direction indicators 102*a*-102*d* may blink, change colors etc. to indicate available and/or selected docking surfaces, and also to indicate current control functionality with respect to those docking surfaces.

FIG. 13 depicts another example of a user input device 100, which is a joystick 30 having an direction indicator display 115 that is an illuminable ring 106 illuminable in portions to provide direction indicators 102. In the depicted example at FIG. 13, the illuminable ring is controlled to depict two separately illuminable portions as direction indicators 102*d* and 102*e*, or halves, illuminable to indicate docking surfaces and/or docking functionality on either of the port or starboard sides of the marine vessel. In such an example, the control system 24 may be configured to only provide docking on the sides of the marine vessel, and thus may only indicate docking surfaces, such as docking surfaces generally on the starboard side of the marine vessel by illuminating section 102*d* and indicating docking surfaces generally on the port side of a marine vessel by illuminating section 102*e* of the illuminable ring 106. In other embodiments, the illuminable ring may provide four separately illuminable quadrants, as depicted in the examples above. In still other embodiments, more direction indicators may be provided, such as five illuminable sections, each illuminable section associated with one side of the simplified vessel outline.

In the embodiment of FIG. 13, the joystick 30 may be moveable to provide user input for selecting a docking surface. In the illustration, the direction indicator 102*e* illustrates a potential docking surface 105 on the port side of the marine vessel. Movement of the joystick 30 in that same direction may be interpreted as a user input selection of the docking surface. Alternatively or additionally, the joystick control functionality may be used in conjunction with user input via one or more of the buttons 31, such as to engage autonomous docking mode and then select a direction by moving the joystick 30.

Figure 9:
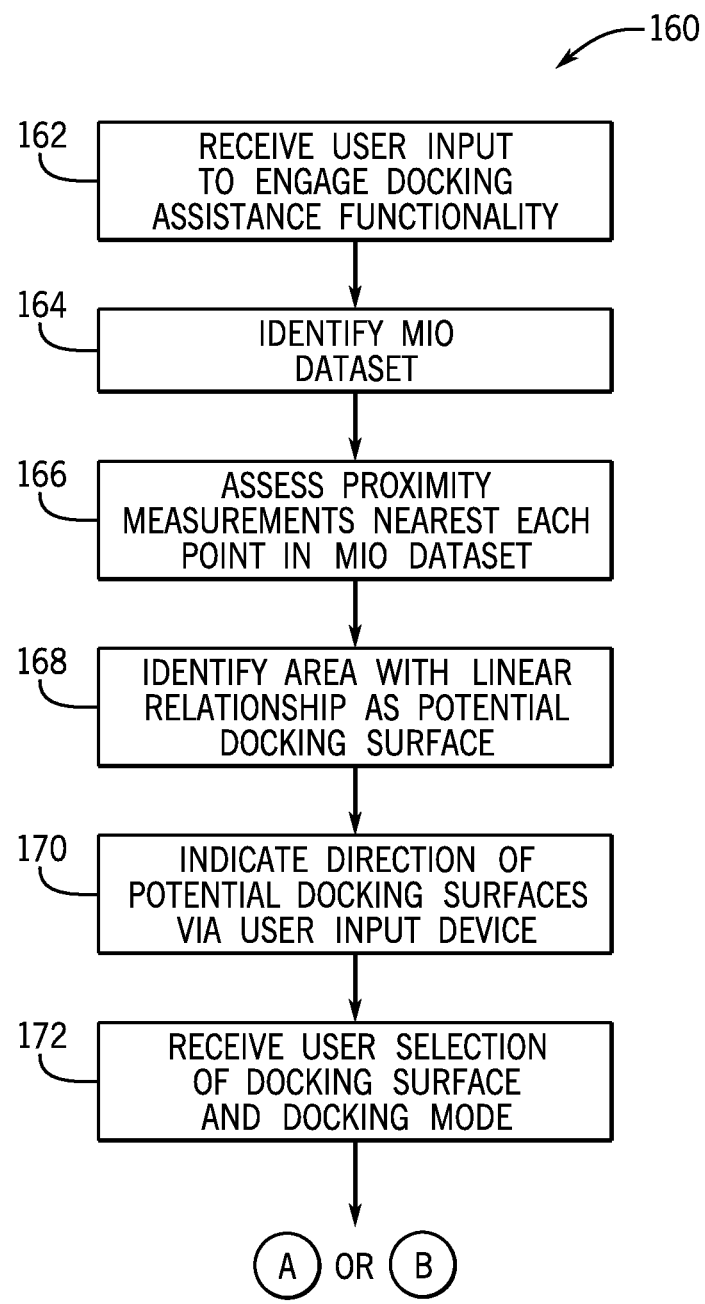
FIGS. 9 and 10A-10B are flow charts exemplifying methods for controlling a propulsion system in accordance with embodiments of the present disclosure.

FIG. 9 depicts one embodiment of a method 160 of operating a propulsion control system 20. User input is received at step 162 to engage docking assistance control functionality. This may be a user input provided to initiate the control system to detect potential docking surfaces 105. With reference to FIGS. 12A-12C, for instance, the docking assistance functionality may be engaged in response to a user depressing the center key 116 on the keypad 28. Similar inputs may be provided via other user input devices, such as via a button 31 associated with the joystick 30. Once the docking assistance functionality is engaged, an MIO dataset is identified at step 164. Examples of methods for determining an MIO dataset are described above. Potential docking surfaces may then be identified by assessing proximity measurements around each point in the MIO dataset, step 166. In other embodiments, additional proximity measurements may be assessed, such as those within a predetermined distance of the marine vessel 10 (e.g., based on the point of navigation $P_n$ or the vessel outline 80).

Figure 10A:
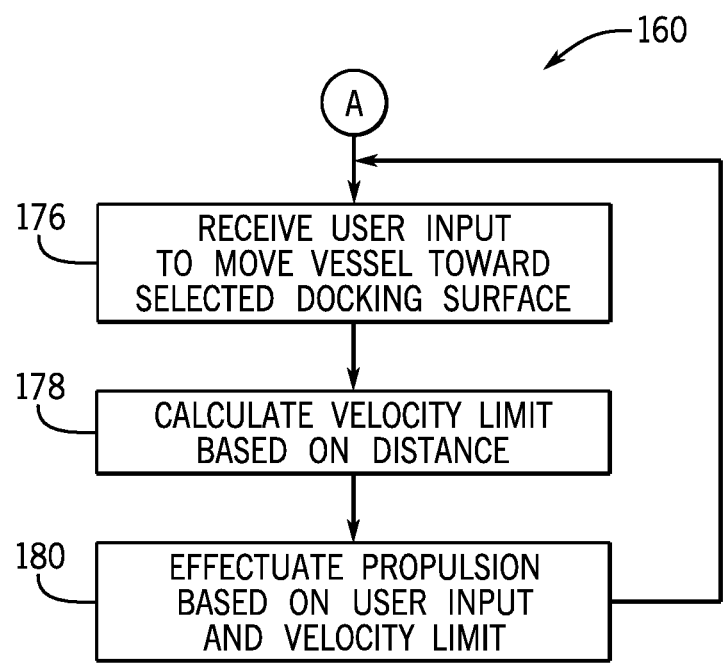

If a group of proximity measurements having a linear relationship is located, then a potential docking surface is identified at step 168. For example, the potential docking surface may be identified as the least squares regression line or other best fit line of a group of proximity measurements. A direction of the identified potential docking surface is indicated via a user input device at step 170, such as by presenting a direction indicator on a display 115 of a user input device to visually indicate a direction of the potential docking surface with respect to the marine vessel 10. A user selection is then received via the user input device at step 172 in order to select a docking surface and/or a docking mode. With reference to the examples described above, for example, the controller 24 and user input device 100 may be configured to allow a user to select one of an auto-docking mode or a semi-autonomous docking mode where user is provided some limited authority to control the marine vessel in order to effectuate docking. The two different mode functionalities are exemplified at FIGS. 10A and 10B.

Where a user selection is made to suspend maintenance of a buffer zone on a docking side of the marine vessel, the controller 24 may execute instructions to perform the steps represented at FIG. 10A. While the buffer zone 51 is maintained on all other sides of the marine vessel, the controller may wait for a user input instruction moving the vessel toward the selected docking surface at step 176. A velocity limit is then calculated at step 178 based on the distance between the marine vessel 10 and the docking surface 150 on the docking side. As described above, the distance calculation may be determined by utilizing the vessel outline method described above. Propulsion is effectuated based on the user input and the velocity limit at step 180, examples of which are described herein. The method of effectuating limited user input authority is engaged continually such that the marine vessel 10 is guided slowly towards the selected docking surface 150 and makes gentle impact therewith. Thereby, the chances of vessel damage and/or unintended collisions with surrounding objects aside from the selected docking surface are also limited.

Figure 10B:
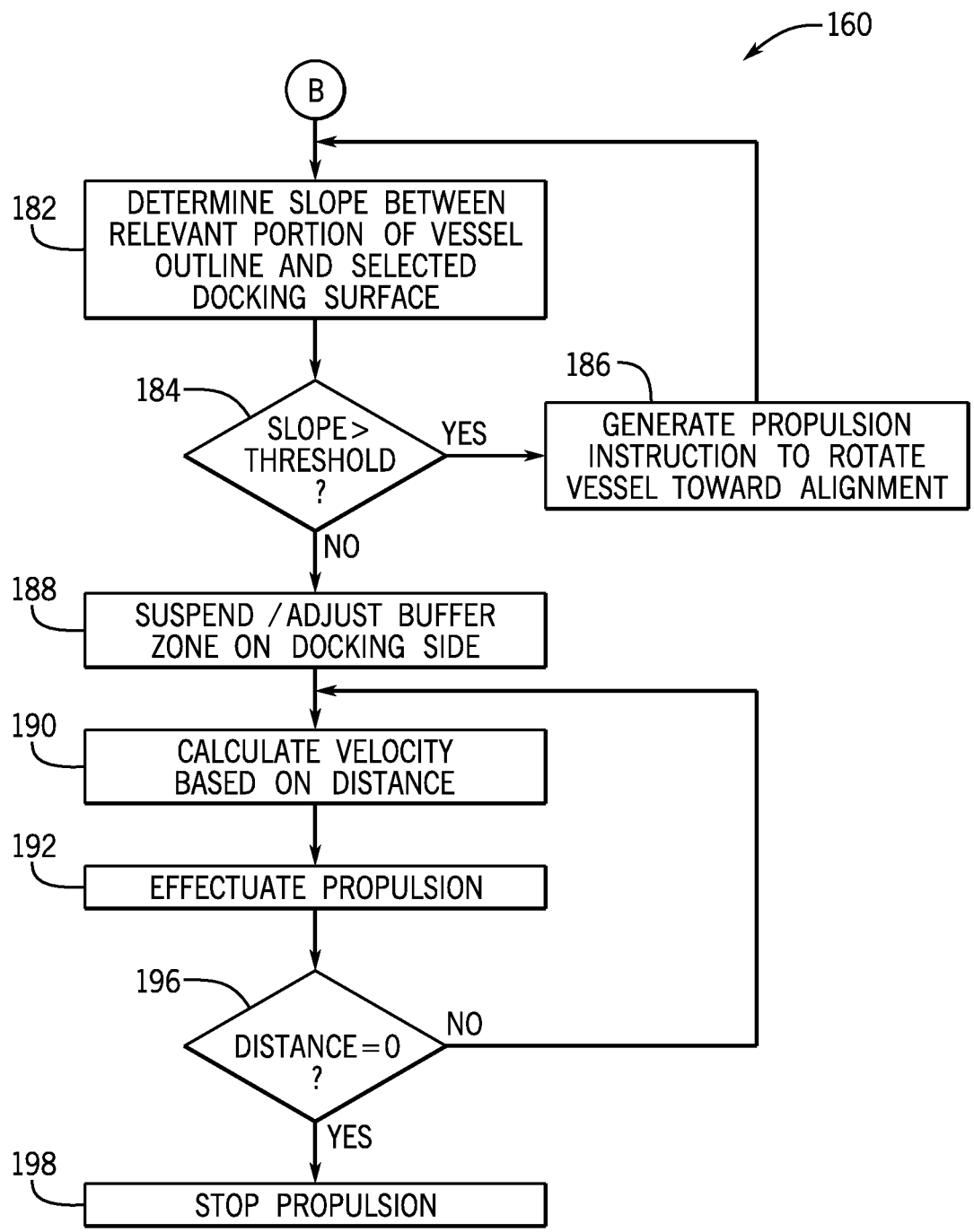

If a user engages autonomous docking in a selected direction via the user input device 100, then instructions are executed by the controller 24 to automatically propel the marine vessel toward the selected docking surface 150 such that the marine vessel makes gentle impact therewith. FIG. 10B exemplifies one implementation of method steps for auto-docking. The controller 24 may first determine an alignment of the marine vessel with respect to the selected docking surface. For example, at step 182 a slope of a relevant side of the vessel outline 80 is determined with respect to the angle of the selected docking surface. The slope is compared to a threshold at step 184. If the magnitude of the slope exceeds a threshold slope, wherein the threshold slope value is set based on an amount of misalignment between the vessel and the dock where corrective action should be taken to align the marine vessel. A propulsion instruction is calculated and generated at step 186 to rotate the marine vessel toward an aligned position such that the relevant side of the marine vessel is parallel to the selected docking surface.

In certain embodiments, the buffer zone 51 may be maintained during the alignment process such that the marine vessel 10 is maintained a full buffer distance away from the selected docking surface. In such an embodiment, the buffer zone 51 may not be suspended or adjusted on the docking side at step 188 until the threshold alignment is reached. Thereafter, the marine vessel can move toward the selected docking surface. In other embodiments, the propulsion instructions may be calculated to perform the alignment rotation at the same time that the marine vessel is moved towards the docking surface 150. In that case, the buffer zone may be suspended or moved earlier in the process, such as upon receipt of the user input to engage autonomous docking with respect to a selected docking surface or side, and the velocity instructions are calculated for simultaneous lateral and rotational movement so as to slide the marine vessel 10 gently against the selected docking surface 150.

In certain embodiments, the velocity for the autonomous propulsion is calculated at step 190 based on proximity measurements (e.g., based on the distance between the vessel outline 80 and the measurement point on the object O), and the propulsion is effectuated at step 192 accordingly. In other embodiments, a predetermined velocity instruction may be effectuated, such as to move the marine vessel at a predetermined or fixed velocity toward the selected docking surface. The propulsion control continues until the marine vessel 10 impacts or is a threshold distance from the docking surface. The impact determination may be, for example, when one or more of the proximity measurements calculating the distance between the vessel outline 80 and the docking surface 150 are equal to 0 (represented at step 196). At that point, the autonomous propulsion control may stop at step 198 and propulsion control may be turned back over to a user. Alternatively, the autonomous control of the propulsion devices may continue in order to effectuate some thrust to maintain the marine vessel 10 up against the selected docking surface 150.

Figure 14:
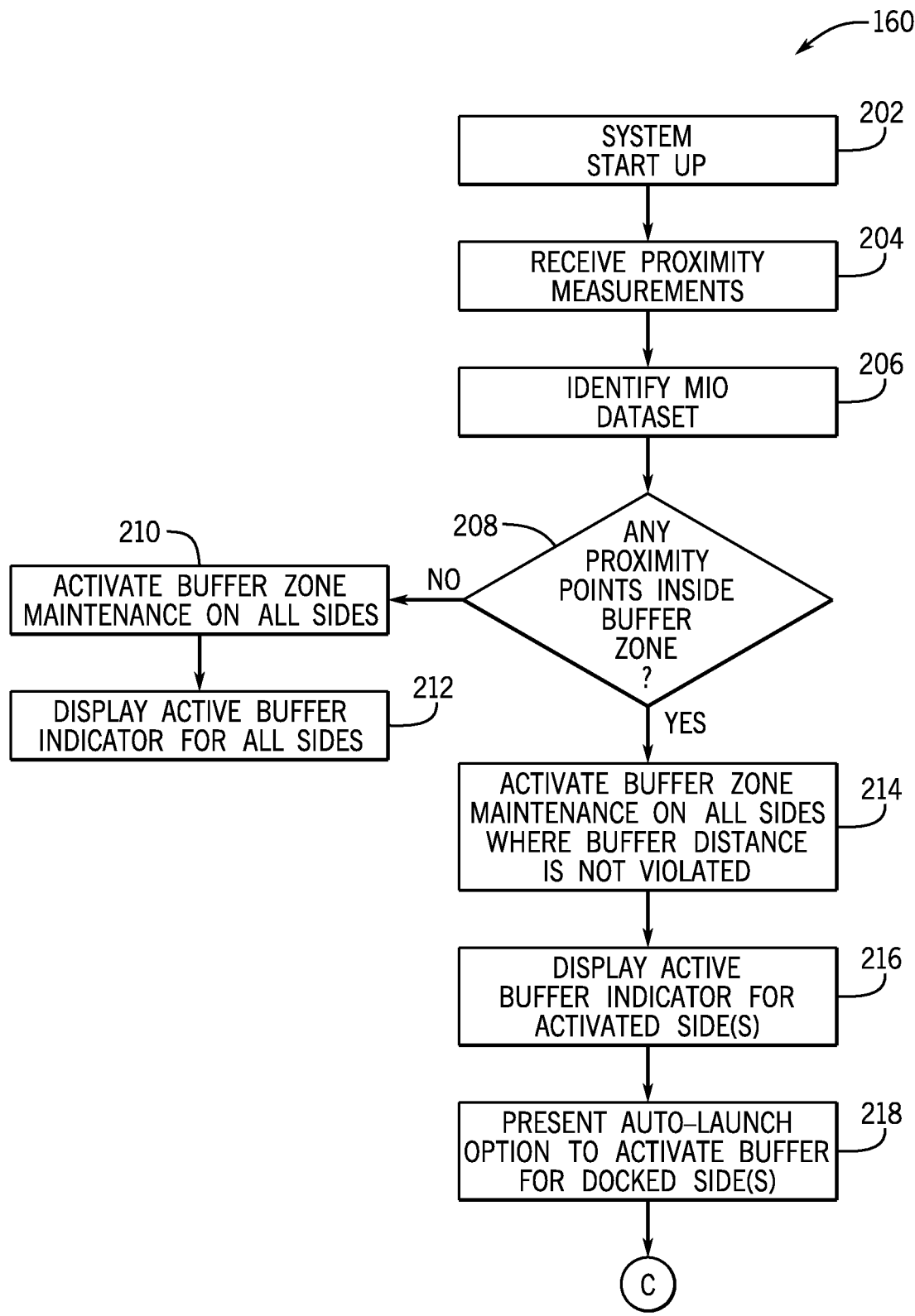
FIGS. 14 and 15 are flow charts exemplifying methods for controlling a propulsion system in accordance with additional embodiments of the present disclosure.
Figure 15:
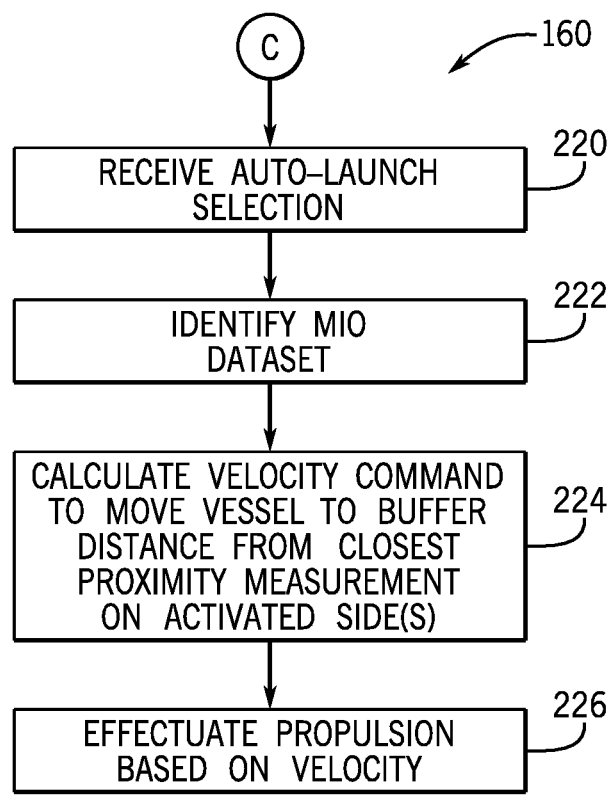

The controller 24 may also execute logic in order to provide vessel launch to move a marine vessel 10 away from an object, such as the docking surface. For example, the controller 24 may be configured to executed instructions in order to autonomously move the marine vessel to a predetermined buffer distance 50 from the dock, which is performed while maintaining buffer distance on the remaining sides of the marine vessel as well, thereby to safely launch a marine vessel from a docked position without impacting any surrounding object. In the example at FIG. 14, the control system starts up at step 202, such as upon engine startup where a marine vessel is docked adjacent to a docking surface. The proximity sensors 72-78 are activated and perform proximity measurements around the marine vessel at step 204 to locate all nearby objects. An MIO dataset is identified at step 206 as described above. The system determines at step 208 whether any of the measurements in the MIO dataset are inside the buffer zone. If not, then it is determined that the marine vessel is not docked against any object or docking surface and that the buffer zone can be activated and maintained on all sides at step 210. An active buffer indicator may be displayed on the user input device 100 to indicate that the buffer zone is active on all sides. To provide one example, all direction indicators 102a-102d may be displayed or illuminated, such as on the illuminable ring 106. In another example, the entirety of the illuminable ring 106 may be illuminated, such as exemplified in FIG. 12A.

Returning to step 208, if any of the proximity points on the MIO dataset are less than a threshold distance (e.g. the buffer distance 50), then it may be determined that the marine vessel is positioned against an object (e.g., docked). The buffer zone 51 is activated on all clear sides at step 214 (the sides for which the buffer distance is not violated). The active buffer indicator may be displayed on the user input device 100 for all activated sides at step 216. FIG. 12C demonstrates a user input device 100 exemplifying such scenario, where the direction indicators 102a, 102c, and 102d on the direction indicator display 115 are illuminated to indicate that the buffer zone 51 is active on the front, rear, and port sides of the marine vessel (see FIG. 5B). The direction indicator 102b on the starboard side is not illuminated, indicating that the buffer zone is not active to maintain the normal buffer distance 50 on that side and that the marine vessel is positioned against an object. In one embodiment, the system may be configured to not make any buffer calculations on the "inactive" side, in other embodiments a modified buffer distance 50' may be set such that no propulsion instruction will be automatically generated to move the marine vessel away from the dock absent user input instruction.

The user input device 100 may then be controlled at step 218 to present an option to the user to autonomously launch the marine vessel away from the docking surface and activating the buffer zone on that side—i.e., to move, or launch, the marine vessel 10 away from the docking surface. If user input is received to activate auto-launch, and thus to activate the buffer distance on the docked side (step 220), then steps may be executed to enact autonomous vessel control to move the marine vessel safely away from the docking surface without impacting any other of the surrounding objects. In order to do so, the MIO dataset is identified at step 222 and a velocity command is calculated at step 224 accordingly. For example, the velocity command is calculated to move the marine vessel away from the docking surface, or docking surfaces, that are within the buffer zone 51. The direction and magnitude of the velocity command is calculated based on the MIO dataset so as to avoid moving the marine vessel to close to any other objects surrounding the marine vessel 10. Vessel propulsion is effectuated at step 226 based on the velocity command.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method for controlling a propulsion system of a marine vessel, the method comprising:
   receiving proximity measurements from one or more proximity sensors on the marine vessel;
   identifying, based on the proximity measurements, an object located less than a buffer distance from a side of the marine vessel;
   controlling a display device to indicate the side of the marine vessel where the object is located;
   receiving a user input to activate a buffer zone on the side of the marine vessel where the object is located; and
   automatically controlling at least one propulsion device based on the proximity measurements to move the marine vessel away from the object.

2. The method of claim 1, wherein the object is a docking surface, and wherein automatically controlling the at least one propulsion device based on the proximity measurements to move the marine vessel away from the object includes launching the marine vessel from the docking surface.

3. The method of claim 2, wherein identifying the docking surface includes identifying a linear relationship between a group of proximity measurements on the side of the marine vessel.

4. The method of claim 1, further comprising activating the buffer zone on at least one clear side of the marine vessel where no object less than a buffer distance from the marine vessel is detected such that the respective side of the marine vessel is maintained at least the buffer distance from any object while the marine vessel is moved away from the object.

5. The method of claim 1, wherein the display device is a direction indicator display configured to indicate a predetermined set of directions with respect to the marine vessel, and wherein controlling the display device to indicate the side of the marine vessel where the object is located includes controlling the direction indicator display to indicate at least one of the predetermined set of directions most closely corresponding to the direction of the object.

6. The method of claim 5, wherein the predetermined set of directions with respect to the marine vessel includes front, rear, starboard, and port.

7. The method of claim 5, wherein the direction indicator display is on a display screen, a joystick, or a keypad.

8. The method of claim 1, wherein the user input is received at a joystick or a keypad including a direction indicator display having separately illuminable portions, wherein indicating the side of the marine vessel where the object is located includes illuminating at least one of the separately illuminable portions most closely corresponding to the side of the marine vessel where the object is located.

9. The method of claim 8, wherein the separately illuminable portions are configured to indicate each of a front side, a rear side, a starboard side, and a port side of the marine vessel.

10. The method of claim 8, wherein the direction indicator display comprises an illuminable ring having the separately illuminable portions.

11. A marine propulsion system comprising:
   at least one propulsion device;
   a direction indicator display configured to o visually indicate a direction with respect to a marine vessel;
   a user input device configured to facilitate input for engaging automatic propulsion control functionality with respect to a docking surface;
   a control system configured to:
      receive proximity measurements from one or more proximity sensors on the marine vessel;
      identify, based on the proximity measurements, an object located less than a buffer distance from a side of the marine vessel;
      control the direction indicator display to indicate the side of the marine vessel where the object is located;
      receive a user input at the user input device to activate a buffer zone on the side of the marine vessel where the object is located; and
      automatically control at least one propulsion device based on the proximity measurements to move the marine vessel away from the object.

12. The system of claim 11, wherein the object is a docking surface, and wherein the control system is configured to control the at least one propulsion device to launch the marine vessel away from the docking surface.

13. The system of claim 11, wherein the object is a docking surface, and wherein automatically controlling the at least one propulsion device based on the proximity measurements to move the marine vessel away from the object includes launching the marine vessel from the docking surface.

14. The system of claim 11, wherein the control system is further configured to activate the buffer zone on at least one clear side of the marine vessel where no object less than a buffer distance from the marine vessel is detected such that the respective side of the marine vessel is maintained at least the buffer distance from any object while the marine vessel is moved away from the object.

15. The system of claim 11, wherein the direction indicator display is configured to indicate a predetermined set of directions with respect to the marine vessel, and wherein the control system is configured to control the direction indicator display to indicate at least one of the predetermined set of directions most closely corresponding to the direction of the object.

16. The system of claim 15, wherein the predetermined set of directions with respect to the marine vessel includes front, rear, starboard, and port.

17. The system of claim 15, wherein the direction indicator display is on a display screen, a joystick, or a keypad.

18. The system of claim 11, wherein the user input device is a joystick or a keypad including the direction indicator display.

19. The system of claim 18, the direction indicator display includes separately illuminable portions, wherein indicating the side of the marine vessel where the object is located includes illuminating at least one of the separately illuminable portions most closely corresponding to the side of the marine vessel where the object is located.

20. The system of claim 19, wherein the separately illuminable portions are configured to indicate each of a front side, a rear side, a starboard side, and a port side of the marine vessel.

* * * * *